United States Patent
Lee

(10) Patent No.: US 9,540,269 B2
(45) Date of Patent: Jan. 10, 2017

(54) MANIFOLD BRACKET ASSEMBLY FOR A MODULAR ENCAPSULATED WATER TREATMENT SYSTEM

(71) Applicant: Maxtec Plastics, Inc., Taichung (TW)

(72) Inventor: Shih-Ping Lee, Taichung (TW)

(73) Assignee: Maxtec Plastics, Inc., Taichung (TW)

( * ) Notice: Subject to any disclaimer, the term of this patent is extended or adjusted under 35 U.S.C. 154(b) by 715 days.

(21) Appl. No.: 13/935,510

(22) Filed: Jul. 4, 2013

(65) Prior Publication Data

US 2015/0008173 A1 Jan. 8, 2015

(51) Int. Cl.
*B01D 27/08* (2006.01)
*B01D 35/30* (2006.01)
*C02F 9/00* (2006.01)

(52) U.S. Cl.
CPC ............... *C02F 9/005* (2013.01); *B01D 27/08* (2013.01); *B01D 35/30* (2013.01); *B01D 35/303* (2013.01); *B01D 35/306* (2013.01); *B01D 2201/303* (2013.01); *B01D 2201/4046* (2013.01); *B01D 2201/4053* (2013.01); *B01D 2201/4061* (2013.01); *C02F 2201/004* (2013.01); *C02F 2201/007* (2013.01)

(58) Field of Classification Search
None
See application file for complete search history.

(56) References Cited

U.S. PATENT DOCUMENTS

| | | | | |
|---|---|---|---|---|
| 6,458,269 B1 * | 10/2002 | Bassett | ................. | B01D 27/08 210/119 |
| 7,147,773 B2 * | 12/2006 | Mitchell | ............. | B01D 35/153 210/136 |
| 7,481,926 B2 * | 1/2009 | Dworatzek | ........... | B01D 29/21 210/232 |
| 2011/0100893 A1 * | 5/2011 | Kocksch | ............... | B01D 35/30 210/236 |
| 2012/0228206 A1 * | 9/2012 | Kim | ...................... | B01D 35/30 210/232 |
| 2014/0367321 A1 * | 12/2014 | Lee | ..................... | B01D 35/306 210/232 |
| 2015/0008173 A1 * | 1/2015 | Lee | ........................ | C02F 9/005 210/236 |

* cited by examiner

*Primary Examiner* — Thomas M Lithgow
(74) *Attorney, Agent, or Firm* — Alan D. Kamrath; Kamrath IP Lawfirm, P.A.

(57) ABSTRACT

A manifold bracket assembly has a bracket body and multiple filter heads. The filter heads are mounted on the bracket body, and each filter head has an outer casing, a filter connector, two keyed tabs and two tab fasteners. The filter connector and the keyed tabs are securely mounted in the outer casing by the tab fasteners. The filter connector has multiple hose connectors. The keyed tabs are mounted respectively in two tab holes in the filter connector, and each keyed tab has a key block formed on the inner surface of the keyed tab. Accordingly, the filter heads can be easily and conveniently connected with each other by hoses connected to the hose connectors.

12 Claims, 32 Drawing Sheets

MANIFOLD BRACKET ASSEMBLY FOR A MODULAR ENCAPSULATED WATER TREATMENT SYSTEM

BACKGROUND OF THE INVENTION

1. Field of the Invention

The present invention relates to a manifold bracket assembly and, more particularly, to a manifold bracket assembly for a modular encapsulated water treatment system.

2. Description of Related Art

A conventional water treatment system is applied for filtering water before providing to a user and substantially comprises a manifold bracket and multiple filters to provide different filtering effects to the water. To connect water passages in the filters, a water channel is formed in the manifold bracket. Because the inlets and outlets of the conventional filters may be at different horizontal levels, the water channel in the manifold bracket is formed as a 3D-form to connect the inlets and outlets of the filters. To form the water channel in the manifold bracket, multiple mounting brackets are mounted in and stacked inside the manifold bracket. Each mounting bracket has at least one passage formed in the mounting bracket, such that the water channel is implemented by the passages in the mounting brackets.

However, the passages in the mounting brackets are only able to construct a specific water channel. To form different water channels, different mounting brackets in different passage arrangements are needed. To design and to arrange the passages in the mounting brackets to form a water channel in a complicated form are difficult. Furthermore, the conventional manifold bracket with a water channel implemented by mounting brackets is difficult to connect with a water control electric device, such as flow controller or pressure gauge. Therefore, the conventional manifold bracket is not versatile in use, and the cost for manufacturing the conventional manifold bracket is high.

To overcome the shortcomings, the present invention provides a manifold bracket assembly to mitigate or obviate the aforementioned problems.

SUMMARY OF THE INVENTION

The main objective of the invention is to provide a manifold bracket assembly that is easily manufactured in reduced costs and is versatile in use.

The manifold bracket assembly has a bracket body and multiple filter heads. The filter heads are mounted on the bracket body, and each filter head has an outer casing, a filter connector, two keyed tabs and two tab fasteners. The outer casing is mounted on the bracket body and has an inner surface and two securing recesses defined in the inner surface of the outer casing. The filter connector is tubular, is mounted in the outer casing and has an outer surface, two tab holes and multiple hose connectors. The tab holes are defined through the outer surface of the filter connector and align respectively with the securing recesses in the outer casing. The hose connectors are mounted on the filter connector. The keyed tabs are mounted respectively in the tab holes in the connecting bracket, and each keyed tab has an inner surface and a key block formed on the inner surface of the keyed tab. The tab fasteners are mounted respectively in and protrude partially out of the tab holes and extend respectively into the securing recesses to securely hold the filter connector in the outer casing.

Other objectives, advantages and novel features of the invention will become more apparent from the following detailed description when taken in conjunction with the accompanying drawings.

DETAILED DESCRIPTION OF PREFERRED EMBODIMENTS

Figure 1:
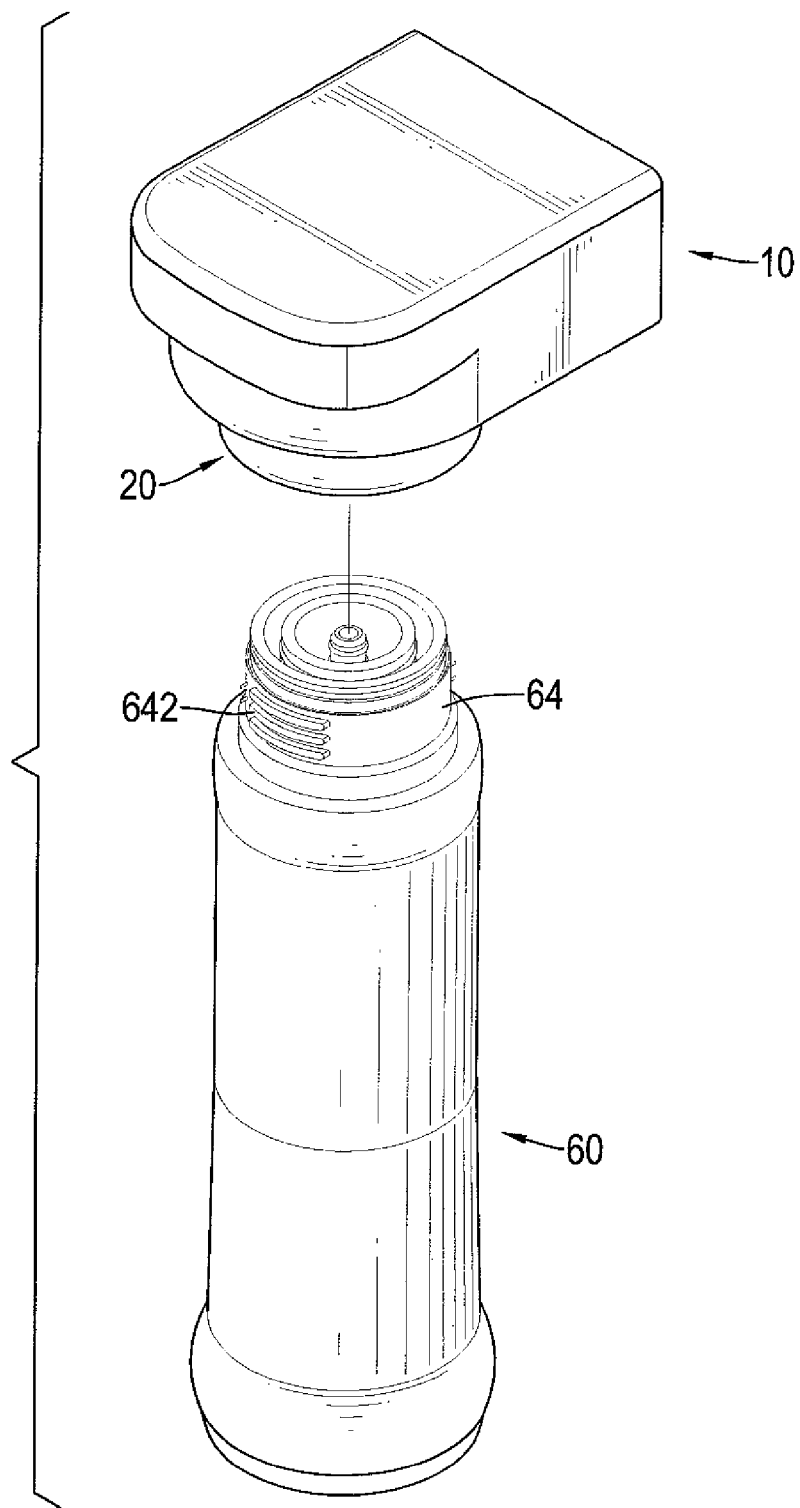
FIG. 1 is an exploded perspective view of a first embodiment of a manifold bracket assembly in accordance with the present invention with a filter.
Figure 2:
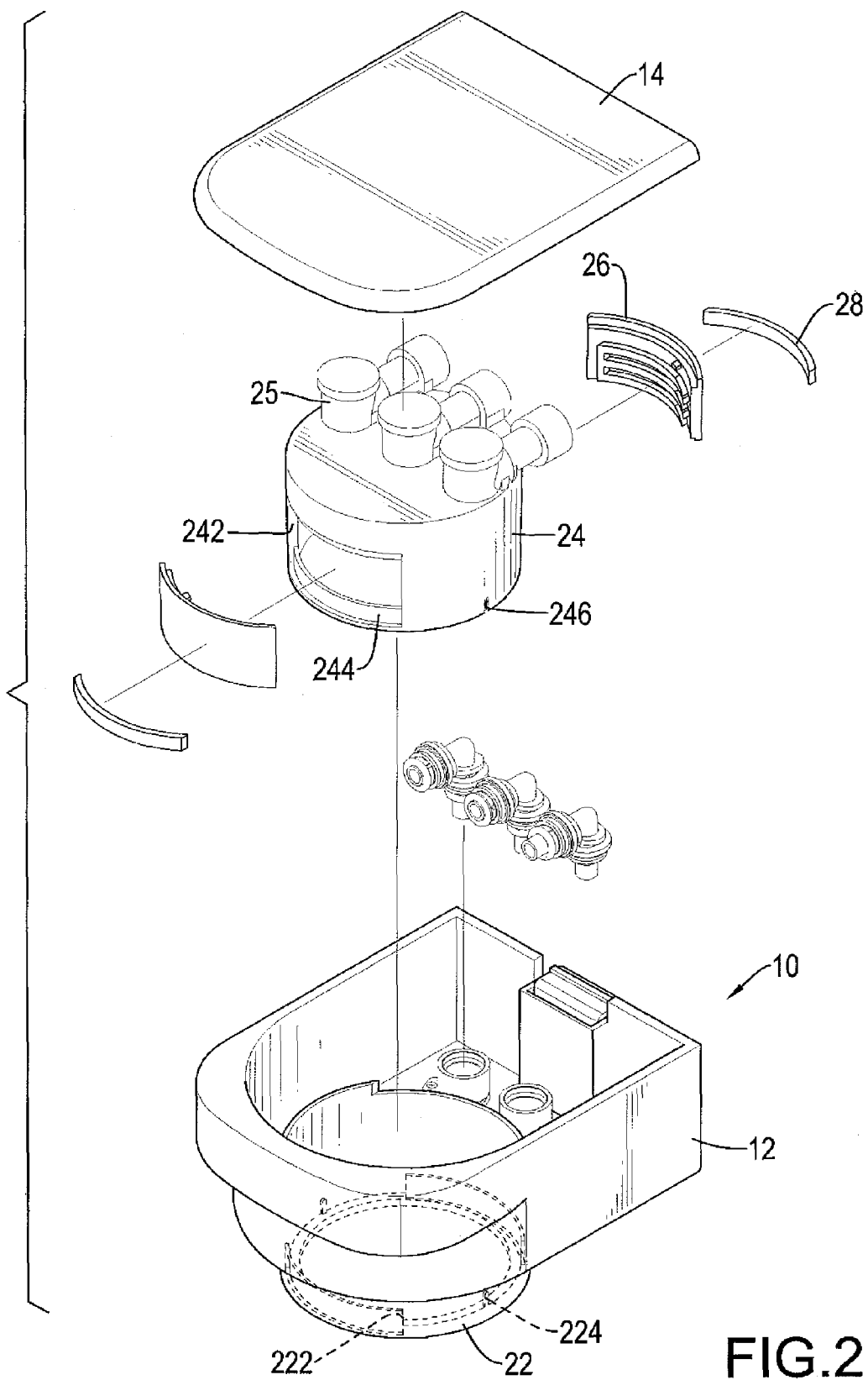
FIG. 2 is an exploded perspective view of the manifold bracket assembly in FIG. 1.
Figure 3:
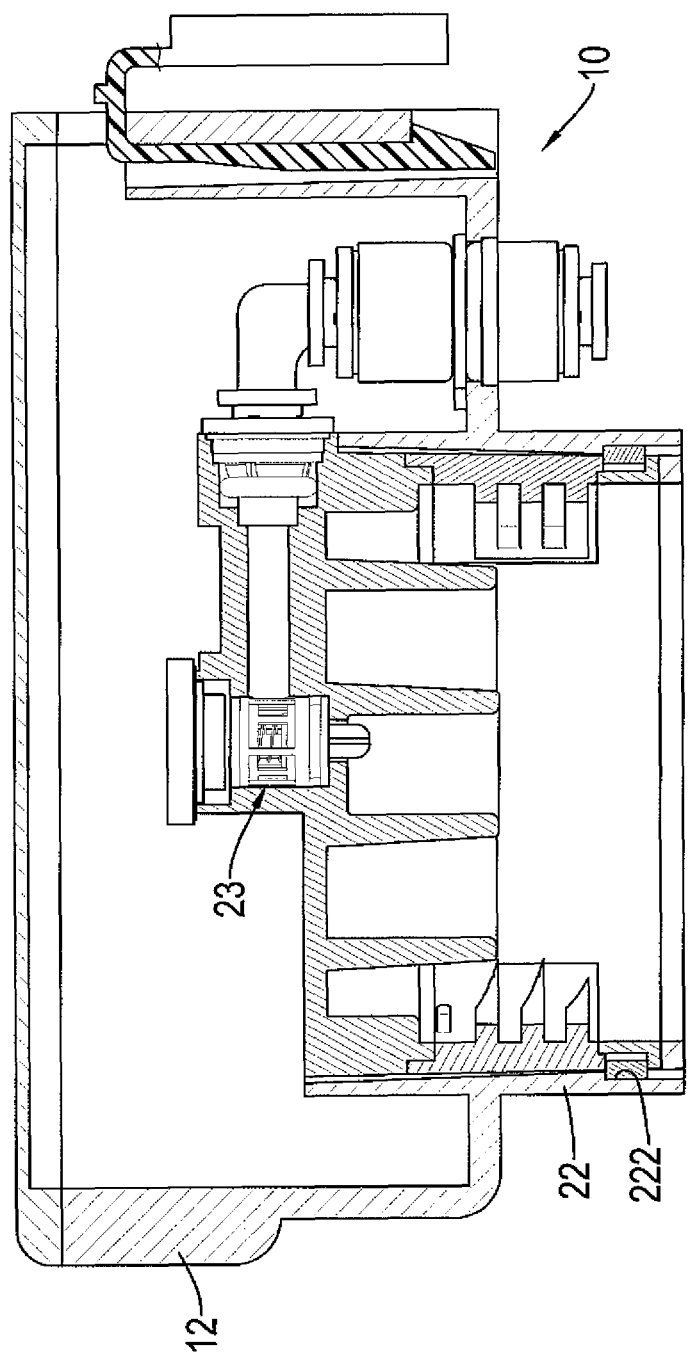
FIG. 3 is an enlarged side view in partial section of the manifold bracket assembly in FIG. 1.

With reference to FIGS. 1 to 3, a manifold bracket assembly for a modular encapsulated water treatment system comprises a bracket body 10 and at least one filter head 20.

Figure 4B:
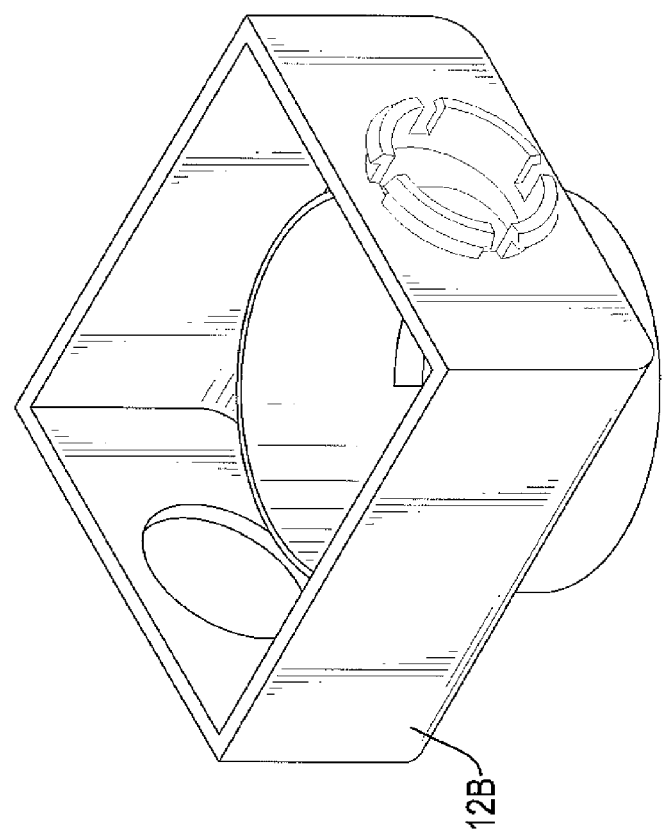
FIGS. 4A and 4B show perspective views of embodiments of frames of bracket bodies in accordance with the present invention.
Figure 4A:
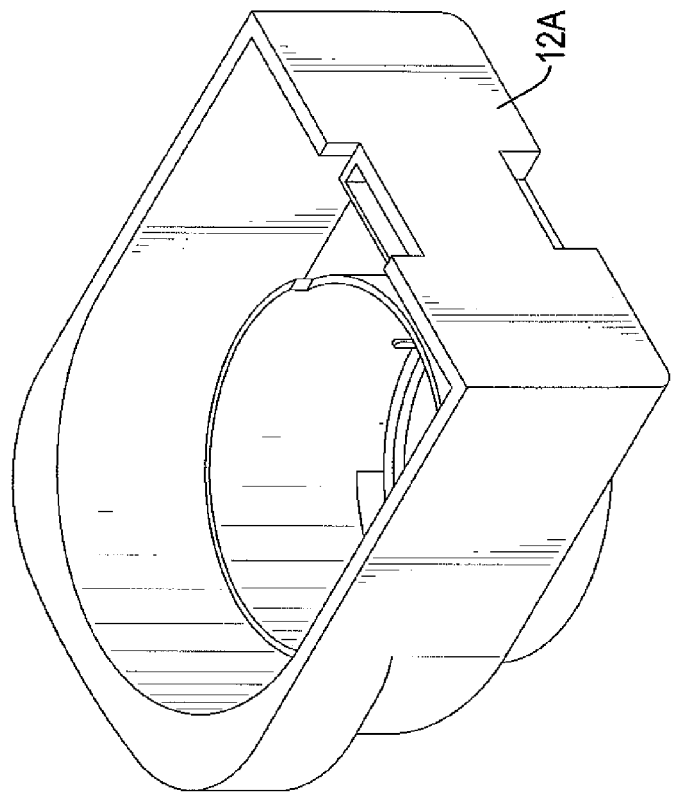

The bracket body 10 is hollow and may comprise a bracket frame 12 and a lid 14. The bracket frame 12 is hollow and has a top, a bottom and a top opening formed in the top. The lid 14 is mounted on the top and closes the top opening of the bracket frame 12. With further reference to FIGS. 4A and 4B, the bracket frame 12A,12B may be rectangular or square in cross section.

The at least one filter head 20 is combined with the bracket body 10. In the first embodiment, a filter head 20 is implemented, and the filter head 20 has a water flow passage formed inside the filter head 20 and comprises an outer casing 22, a filter connector 24, two keyed tabs 26 and two tab fasteners 28.

Figure 5B:
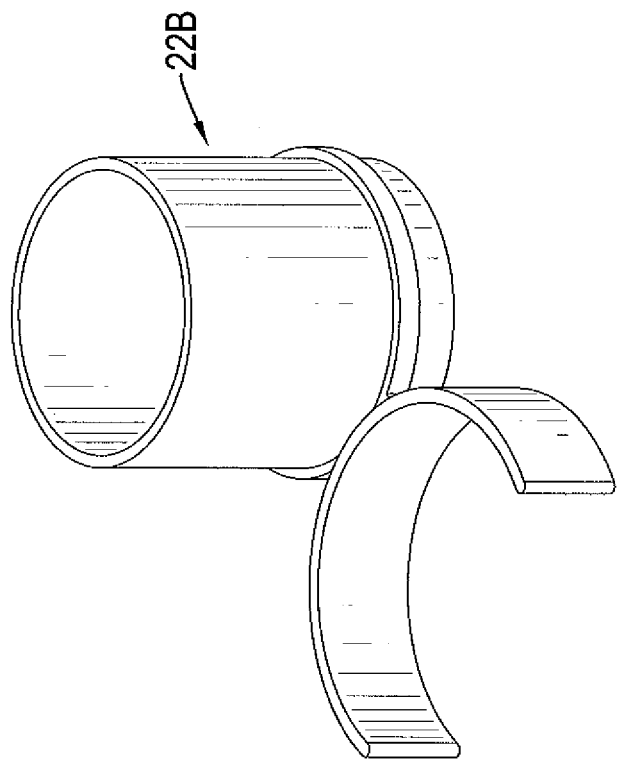
FIGS. 5A to 5D show perspective views of embodiments of outer casings in accordance with the present invention.
Figure 5A:
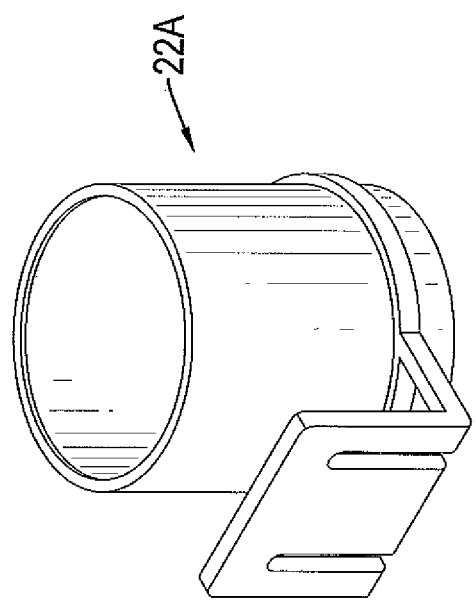
Figure 5D:
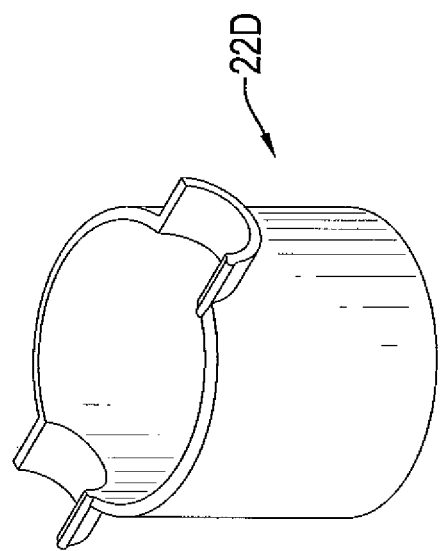
Figure 5C:
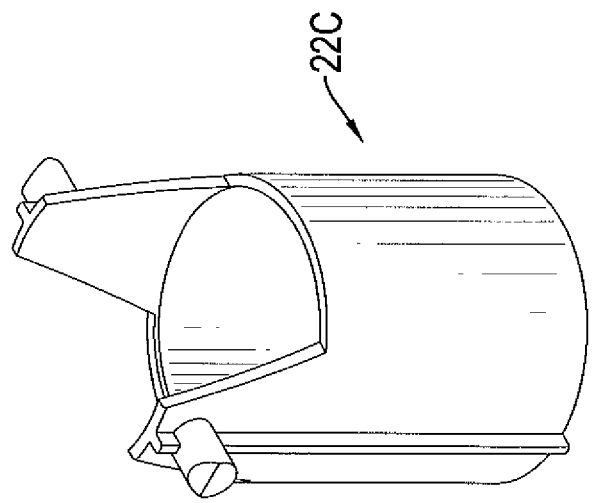
Figure 6B:
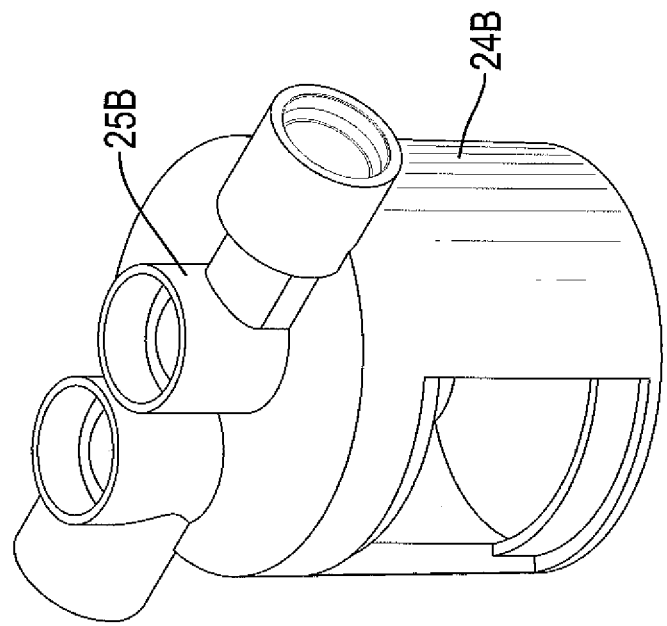
FIGS. 6A to 6F show perspective views of embodiments of filter connectors in accordance with the present invention.
Figure 6A:
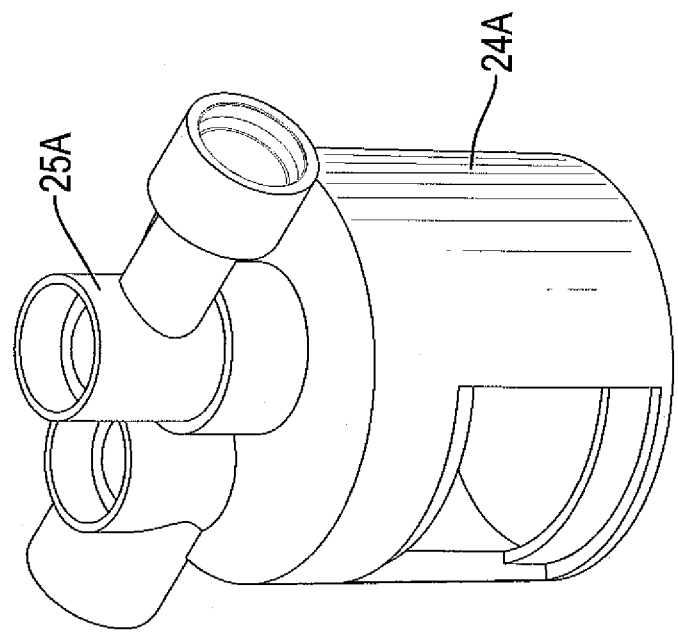
Figure 6D:
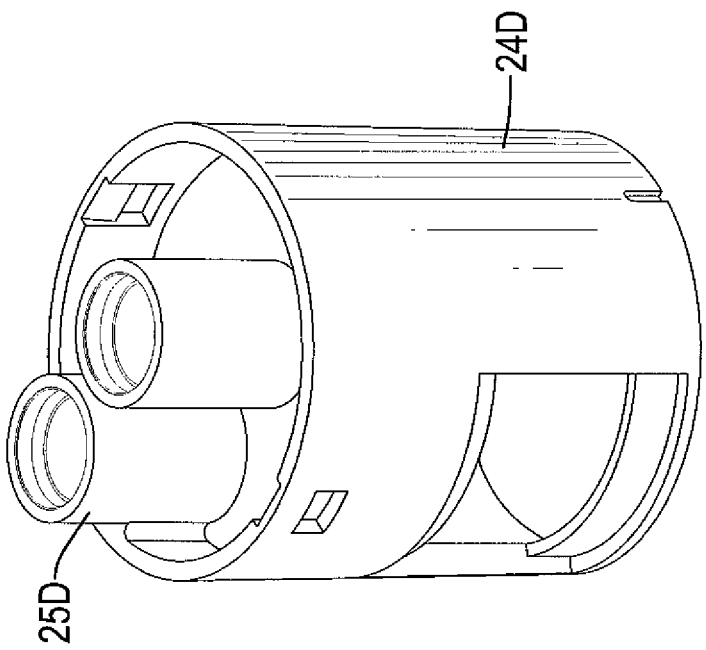
Figure 6C:
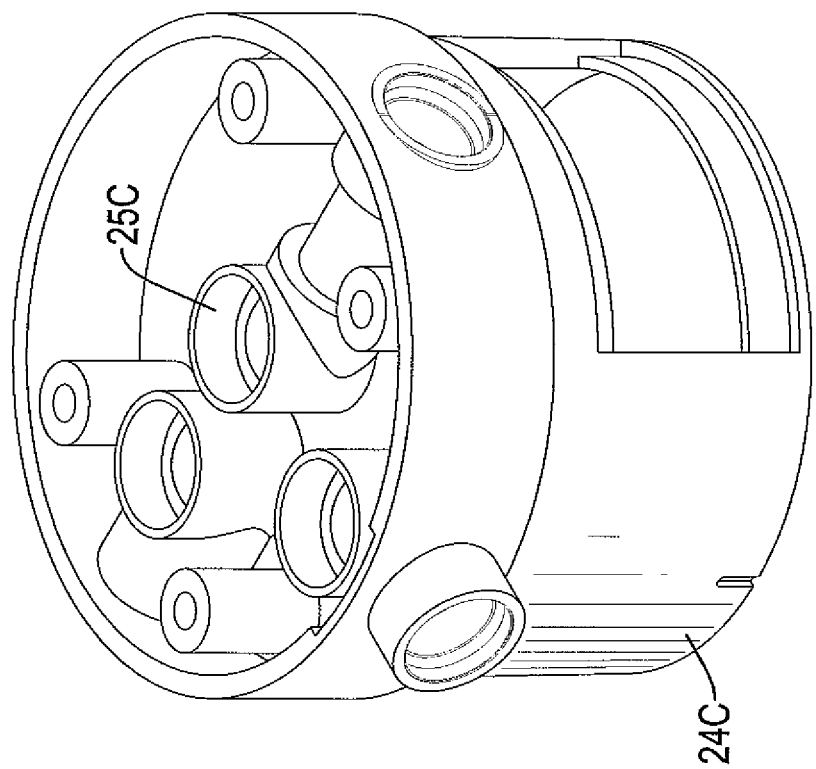
Figure 6F:
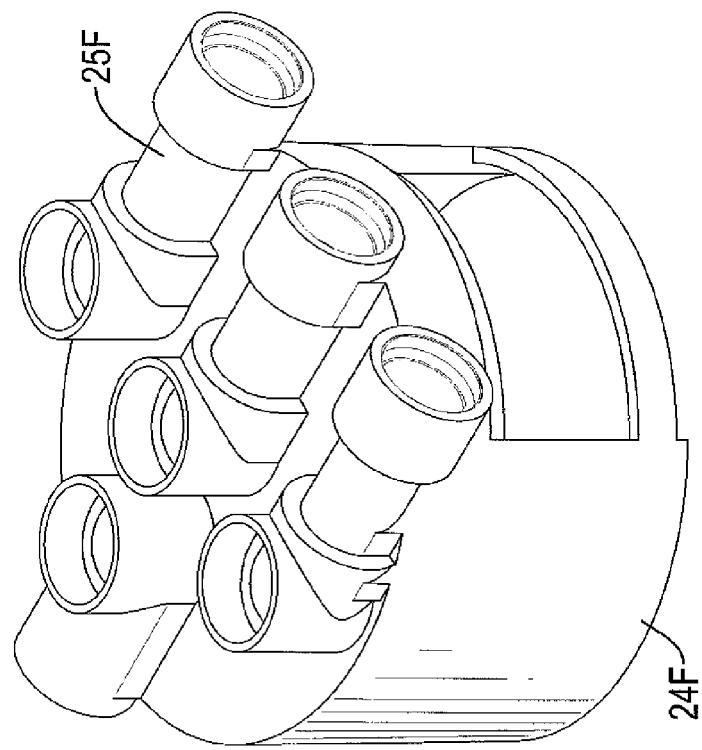
Figure 6E:
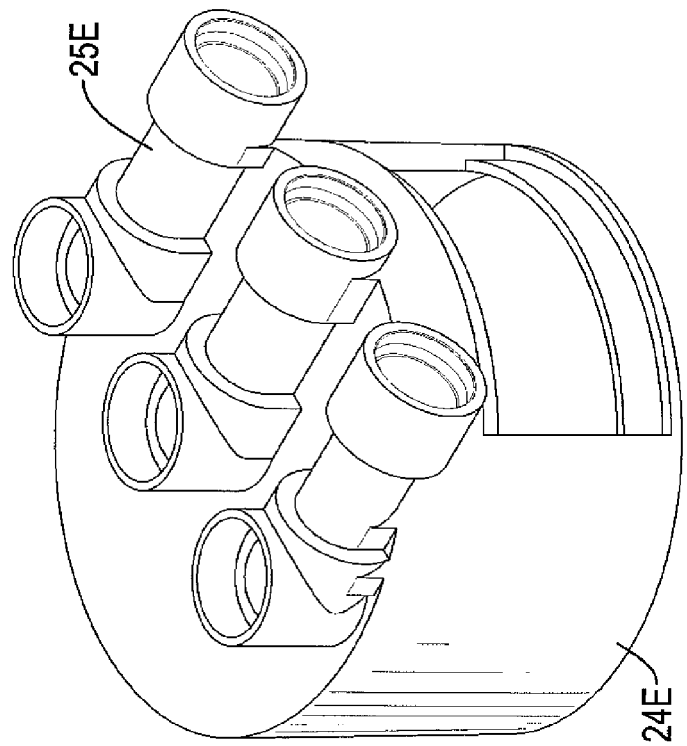
Figure 7A:
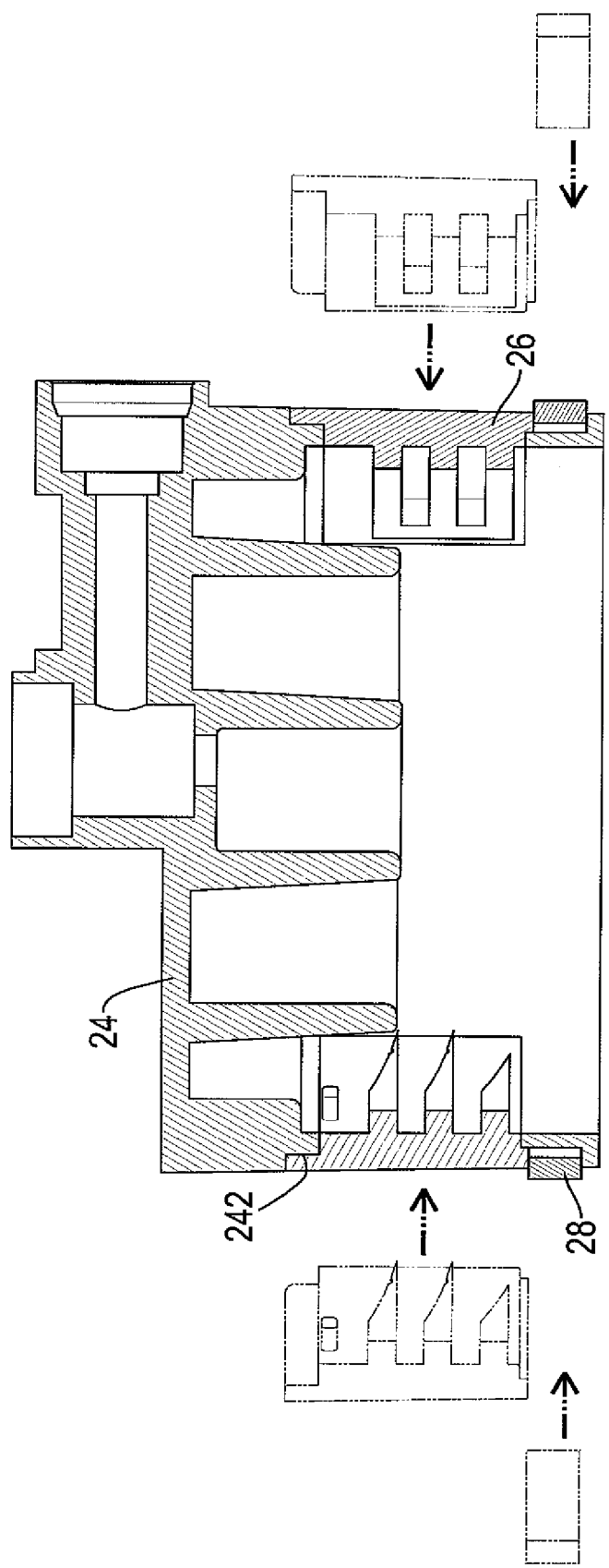
FIGS. 7A to 7E show operational side views and bottom views in partial section of the process of assembling the filter connector and the keyed tabs with the outer casing by the tab fasteners of the manifold bracket assembly in FIG. 1.
Figure 7B:
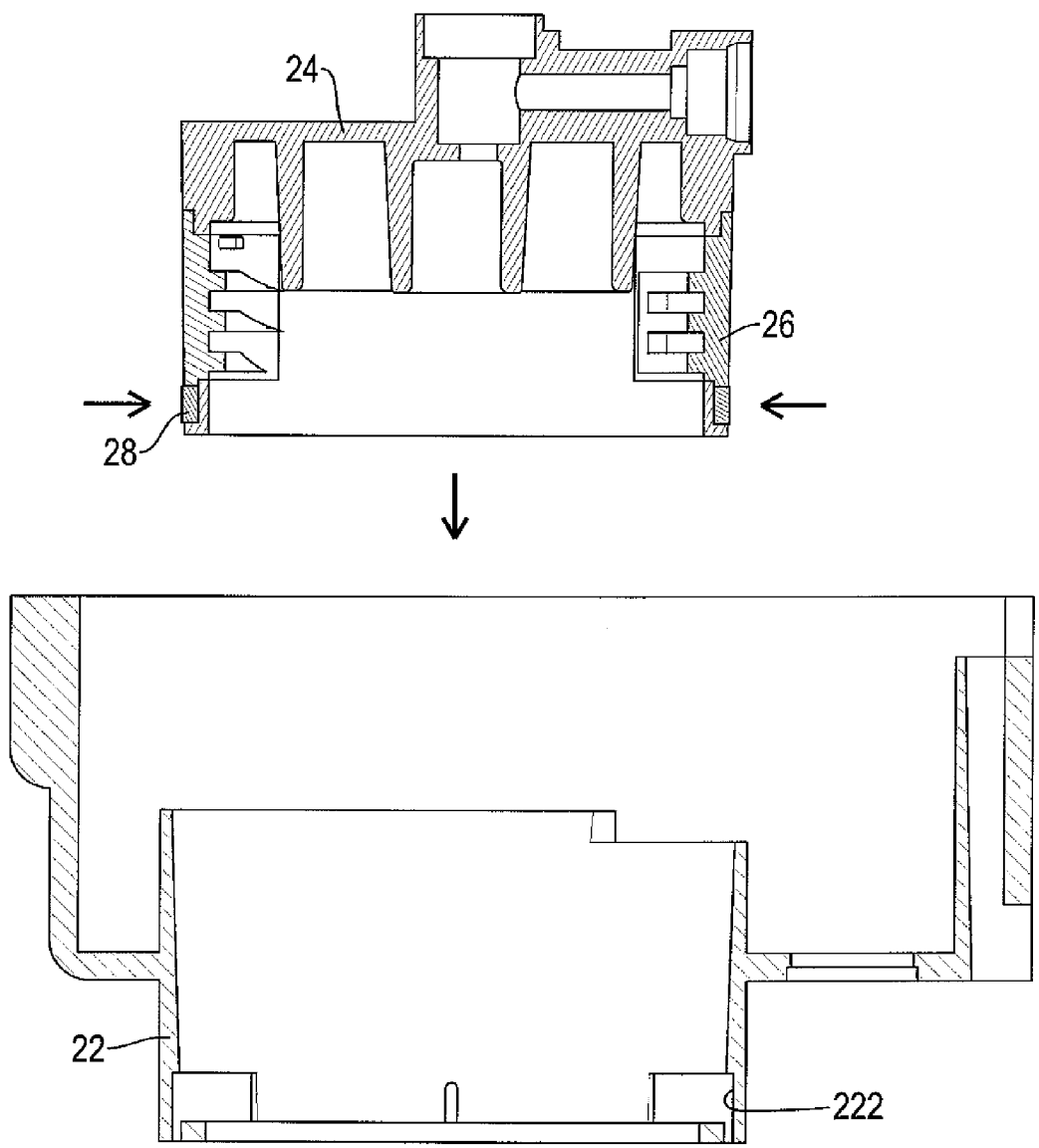
Figure 7C:
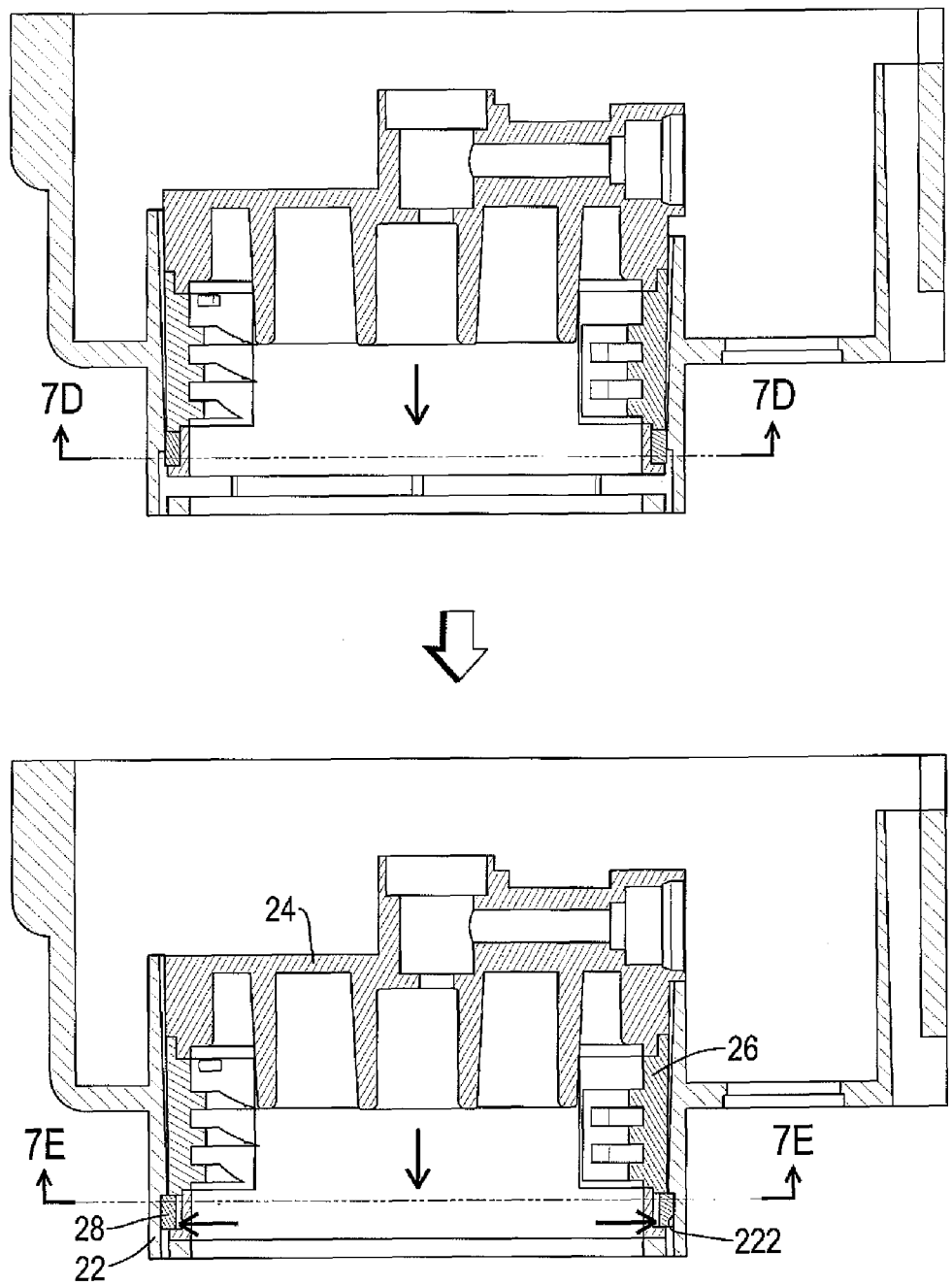
Figure 7D:
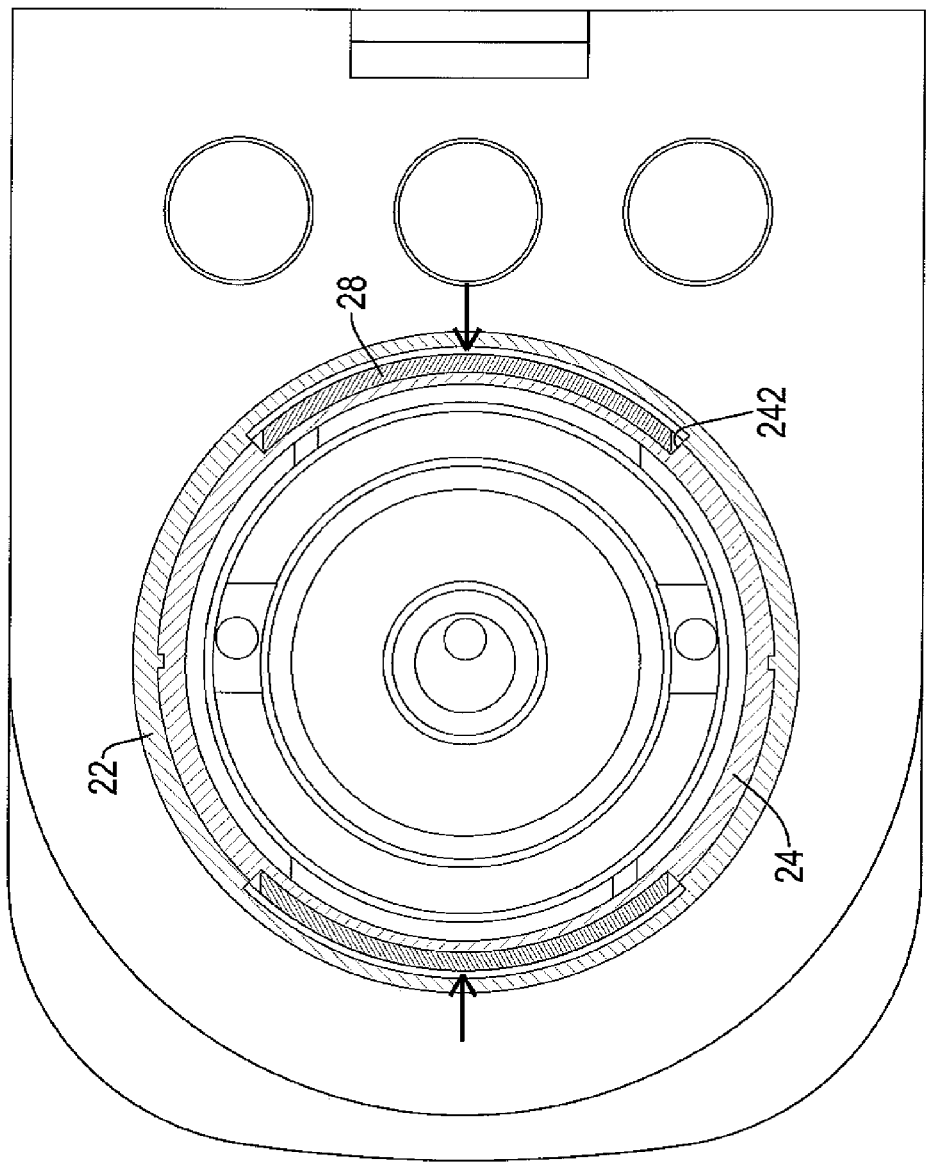
Figure 7E:
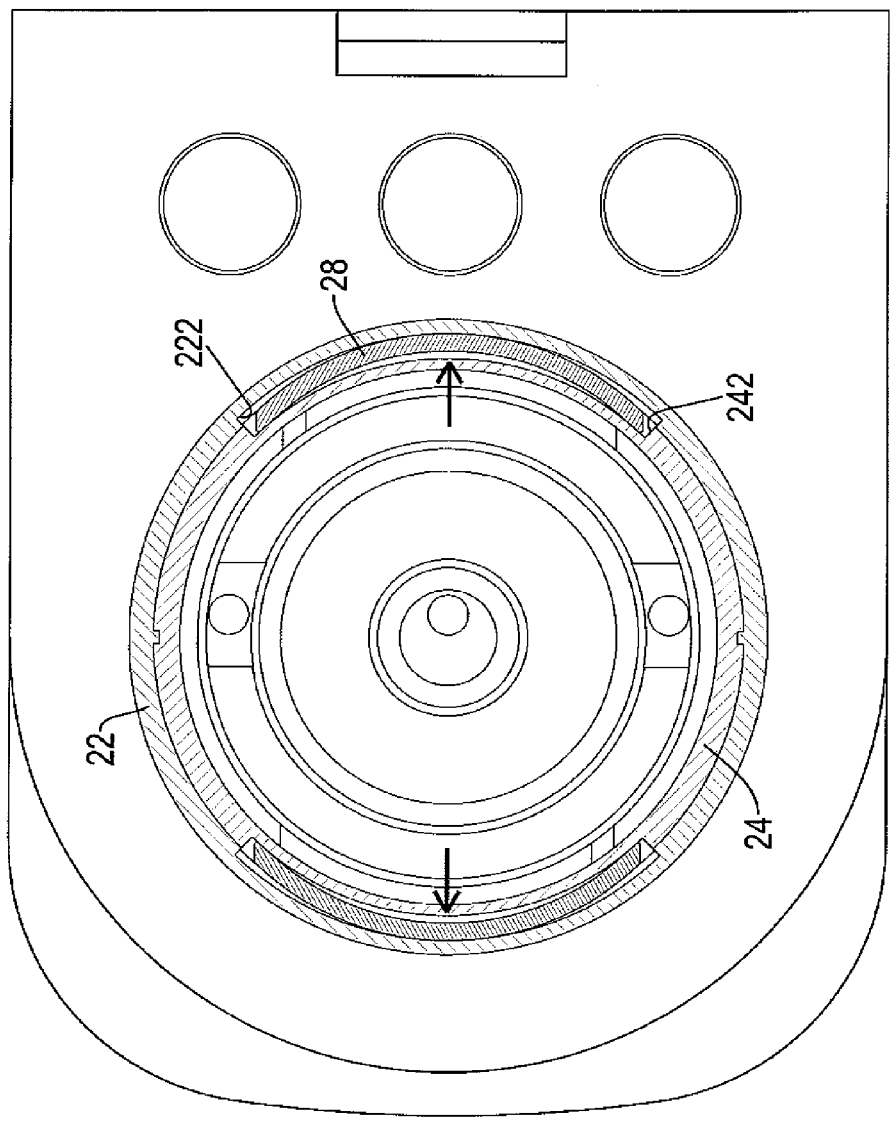
Figure 8A:
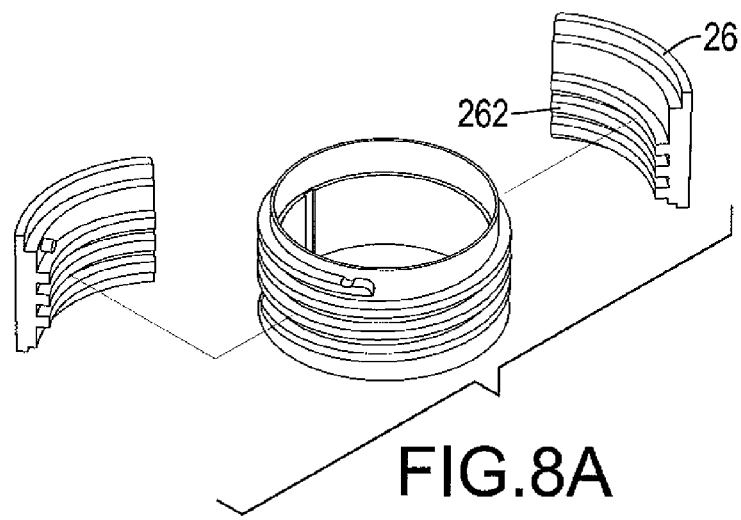
FIGS. 8A to 8L show exploded perspective views of the keyed tabs and the keyed collar with different embodiments of key blocks in accordance with the present invention.
Figure 8B:
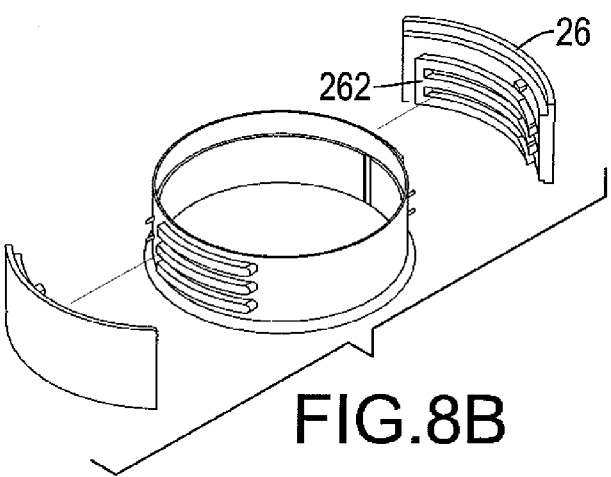
Figure 8C:
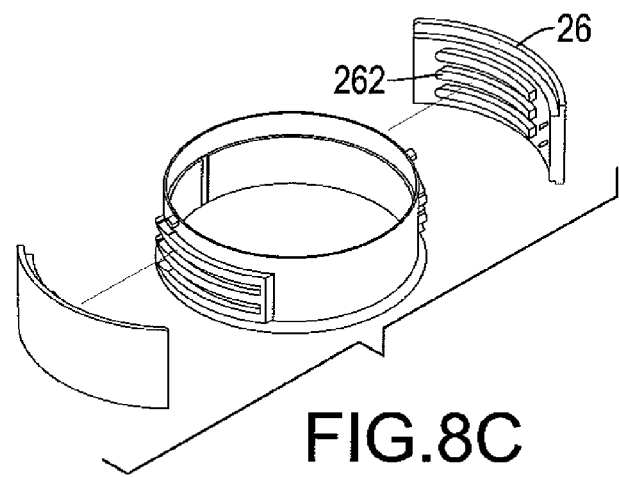
Figure 8D:
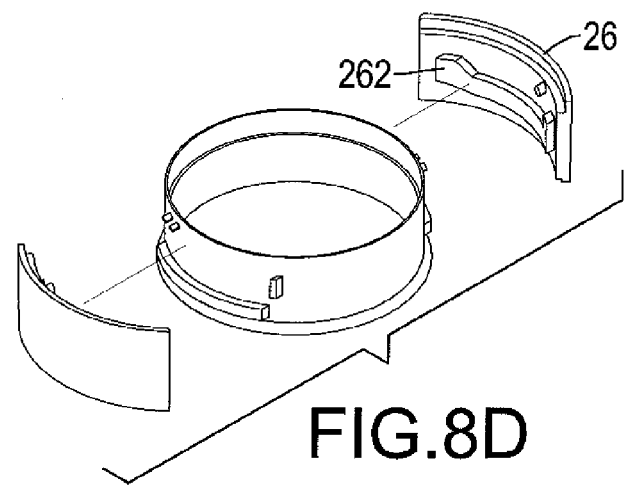
Figure 8E:
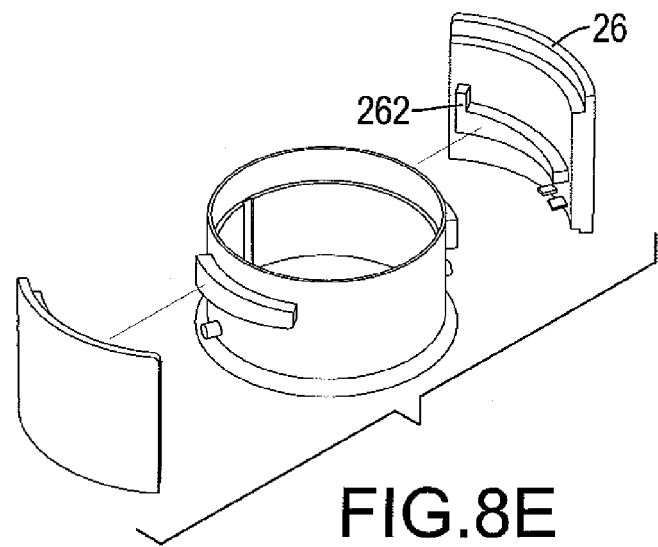
Figure 8F:
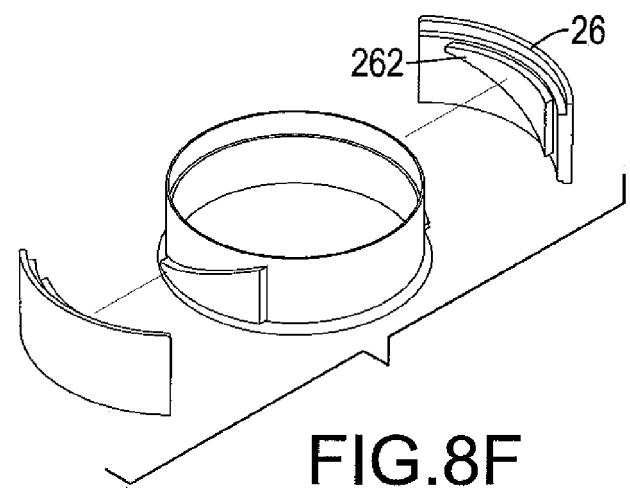
Figure 8G:
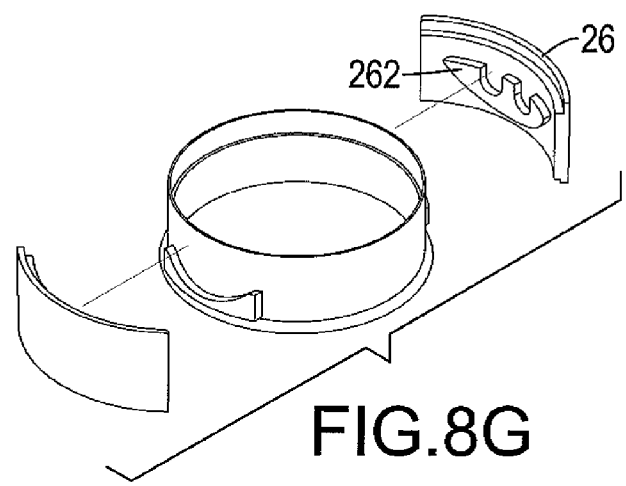
Figure 8H:
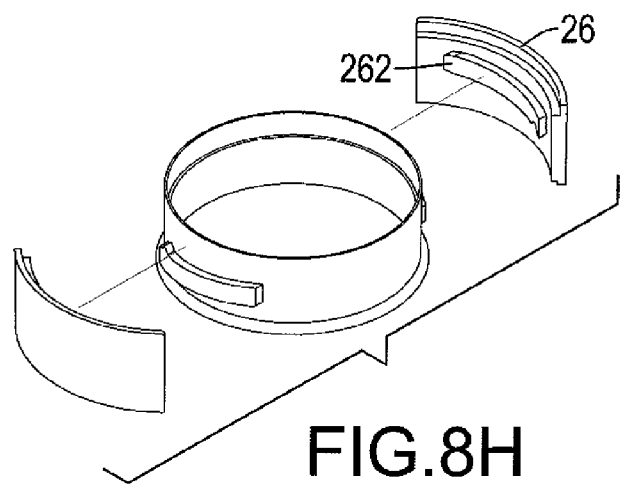
Figure 8I:
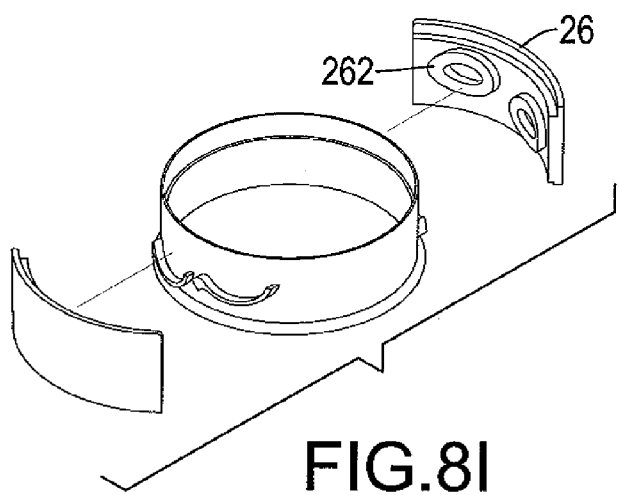
Figure 8J:
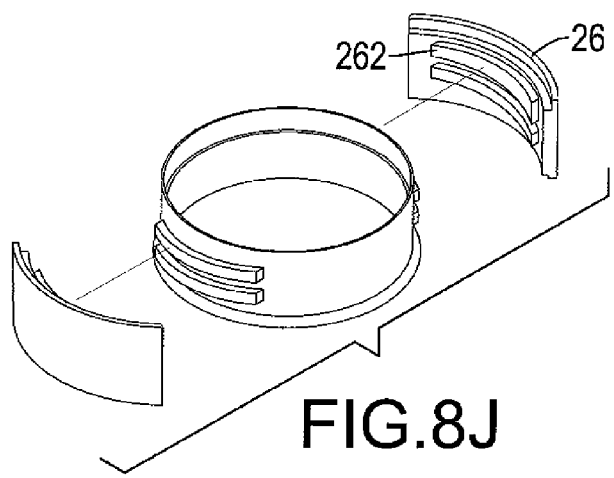
Figure 8K:
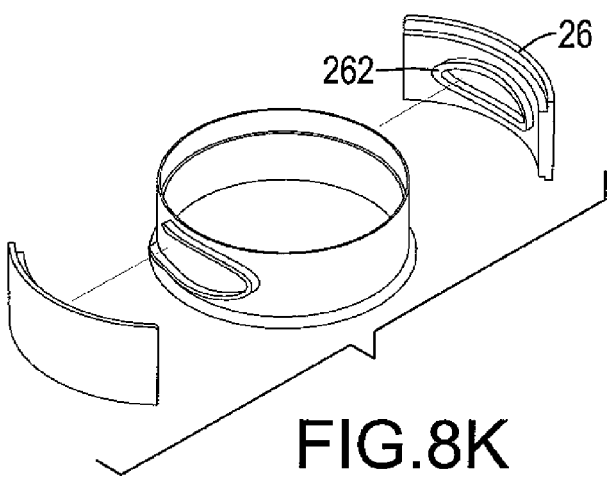
Figure 8L:
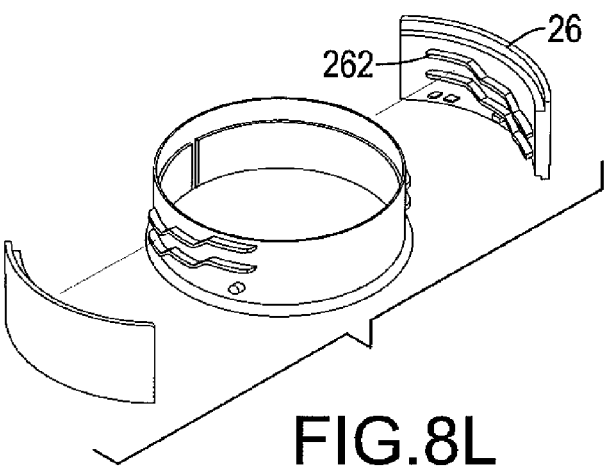

The outer casing 22 is hollow, may be tubular, is securely connected to the bottom of the bracket frame 12 of the bracket body 10 and may be integrally formed on and protrude from the bottom of the bracket frame 12 of the bracket body 10. Alternatively, the outer casing 22 may be a separate element and is combined with the bracket body 10. With reference to FIGS. 5A and 5B, a securing frame or a C-shaped holding ring is mounted on the outer casing 22A, 22B, such that the outer casing 22A, 22B can be connected to an object with the securing frame or the holding ring. With reference to FIG. 5C, two ears are formed on and protrude from the top end of the outer casing 22C to securely connect or mount the outer casing 22C on a specific object. With reference to FIG. 5D, two pivotal ears are formed on and protrude laterally from the top end of the outer casing 22D. In another embodiment, two recesses are defined in the top end of the outer casing for different mounting purposes.

The outer casing 22 comprises an inner surface and two securing recesses 222. The securing recesses 222 are defined in the inner surface near the bottom end of the outer casing 22. Preferably, the securing recesses 222 are located diametrically opposed to each other, and two ends of the outer casing 22 are opened.

A check valve 23 may be mounted in the filter head 20 to control the water flow in the water flow passage as shown in FIG. 3.

The filter connector 24 is tubular, is mounted in the outer casing 22 and has a top, a bottom, an outer surface, multiple hose connectors 25 and two tab holes 242. The water flow passage is formed in and the check valve 23 is mounted in the filter connector 24. The top of the filter connector 24 may be closed, and the hose connectors 25 are mounted on the top of the filter connector 24, communicate with the water flow passage and are connected with hoses. With reference to FIGS. 6A to 6F, multiple hose connectors 25A to 25F are formed on the top of the filter connectors 24A to 24F to fit with different connection purposes.

The bottom of the filter connector 24 may be opened. The tab holes 242 are defined through the outer surface of the filter connector 24 and align respectively with the securing recesses 222 in the outer casing 22. Preferably, each tab hole 242 is a stepped hole and includes a large segment and a through segment. The large segment is defined in and free from the outer surface of the filter connector 24 and has a bottom. The through segment is defined through the bottom of the large segment, so that an abutting shoulder 244 is formed on the bottom of the large segment.

The keyed tabs 26 are mounted respectively in the tab holes 242 in the filter connector 24, and each keyed tab 26 has an inner surface and a key block 262 formed on the inner surface of the keyed tab 26. Preferably, each keyed tab 26 has an area smaller than that of the large segment of the corresponding tab hole 242 and larger than that of the through segment of the corresponding tab hole 242. Accordingly, the keyed tabs 26 respectively abut the abutting shoulders 244 in the tab holes 242 and are kept from entering into the filter connector 24.

The tab fasteners 28 are mounted respectively in and protrude partially out of the tab holes 242 and extend respectively into the securing recesses 222 to securely hold the filter connector 24 in the outer casing 22. Preferably, each tab fastener 28 is curved and has a curvature different from that of the corresponding tab hole 242.

To combine the filter connector 24 with the keyed tabs 26 into the outer casing 22 by the tab fasteners 28, with reference to FIGS. 7A to 7E, the keyed tabs 26 and the tab fasteners 28 are put respectively into the tab holes 242 in the filter connector 24 firstly. Then, the tab fasteners 28 are compressed to enter into the tab holes 242 entirely. The filter connector 24 with the keyed tabs 26 and the tab fasteners 28 are inserted into the outer casing 22 from an end of the outer casing 22. When the tab fasteners 28 align respectively with the securing recesses 222 in the outer casing 22, the tab fasteners 28 will expand and partially protrude out of the tab holes 242 and extend into the securing recesses 222 with the resilience of the tab fasteners 28. Accordingly, the tab fasteners 28 engage the securing recesses 222 to securely hold the filter connector 24 inside the outer casing 22 and to keep the filter connector 24 from rotating relative to the outer casing 22.

In addition, at least one positioning rib 224 and at least one positioning recess 246 are respectively formed on the inner surface of the outer casing 22 and the filter connector 24 and engage each other respectively. With the engagement between the at least one positioning rib 224 and at least one positioning recess 246, a positioning effect is provided, and the filter connector 24 can be kept from rotating relative to the outer casing 22.

The manifold bracket assembly in accordance with the present invention can combined with at least one filter to form a modular encapsulated water treatment system and to provide a specific filtering effect. The filter 60 is connected detachably with the filter head 20, has a water flow passage formed in the filter 60 and comprises a keyed collar 64 provided with a key block 642. The key block 642 is formed on the outer surface of the keyed collar 64 and detachably engages the key blocks 262 on the keyed tabs 26. The key blocks 262 on the keyed tabs 26 has a form, shape and arrangement corresponding to that of the key block 642 on the keyed collar 64. Accordingly, only a filter 60 has a specific key block 642 can be attached to the filter head 20 that has corresponding key blocks 262 on the keyed tabs 26. In practice, the keyed collar 64 may comprise two segments that are respectively formed on two ends of a diameter of the keyed collar 64, and each segment may comprise a spiral, circular or annular rib, an elongated block with at least one notch or cutout formed in a top edge or a bottom edge of the block or multiple parallel, bent or stepped ribs as shown in FIGS. 8A to 8L.

Figure 9:
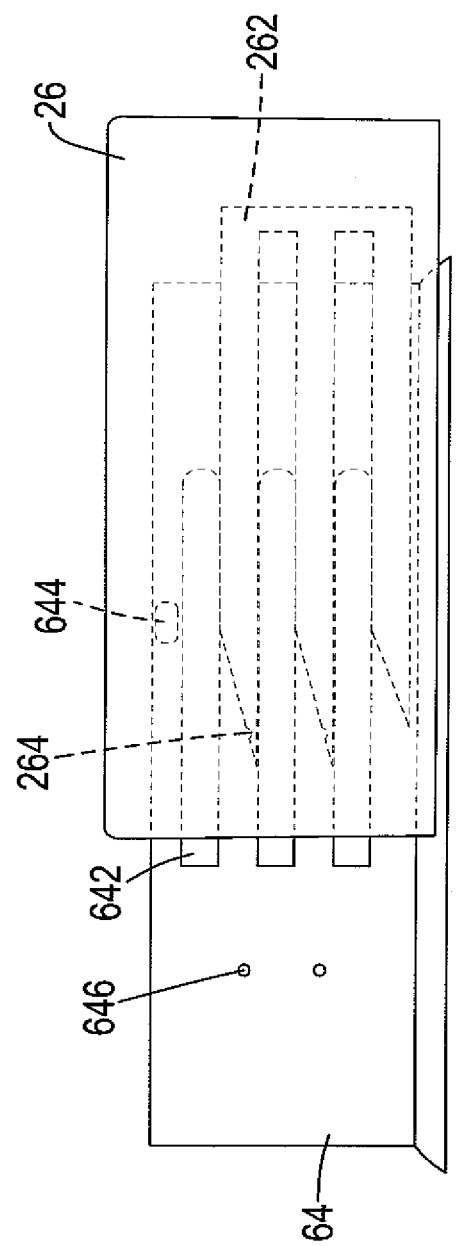
FIG. 9 is an operational side view showing the engagement between the keyed tab and the keyed collar having key blocks in corresponding form, shape and arrangement.
Figure 10:
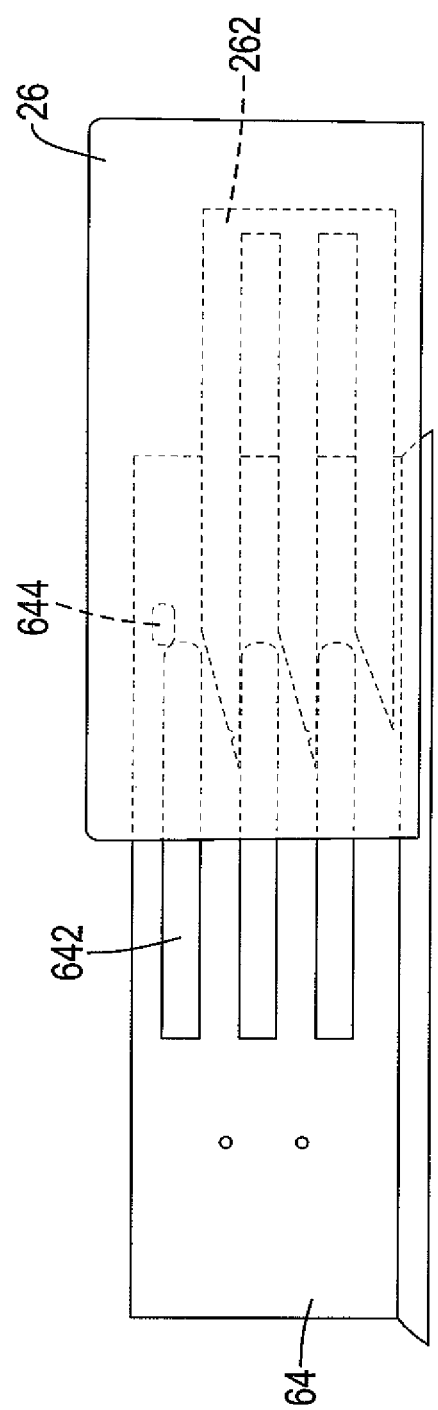
FIG. 10 is a side view showing that the keyed tab and the keyed collar having key blocks not in corresponding form, shape and arrangement cannot engage with each other.
Figure 20:
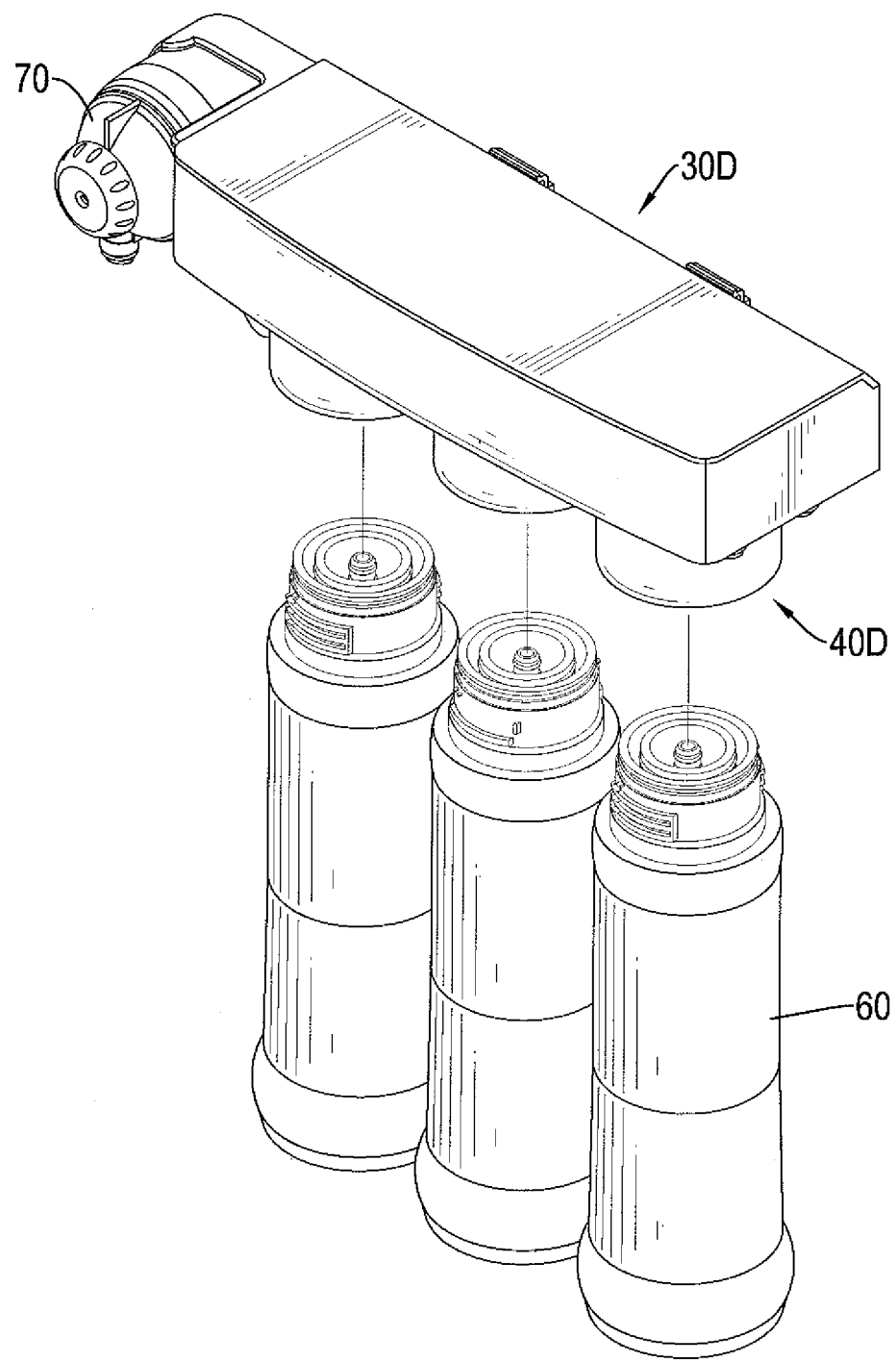
FIG. 20 is an exploded perspective view of an alternative embodiment of a manifold bracket assembly in accordance with the present invention with filters.

With reference to FIGS. 1 and 2, to connect the filter 60 with the filter head 20, the top end of the filter 60 is inserted into the filter head 20 from the opened bottom end of the outer casing 22 and into the filter connector 24. When the top end of the filter 60 enters into the filter connector 24, the key block 642 will align with the key blocks 262 on the keyed tabs 26. With the correspondence of form, shape and arrangement between the key blocks 262,642 on the keyed tabs 26 and the keyed collar 64 as shown in FIG. 9, the filter 60 can be rotated relative to the filter head 20 to communicate the water flow passage in the filter 60 with the water flow passage in the filter connector 24. If the form, shape and arrangement of the key block 642 on the keyed collar 64 do not correspond to the key blocks 262 on the keyed tabs 26 as shown in FIG. 10, the filter 60 cannot be rotated relative to the filter connector 24, and the filter 60 cannot be combined with the filter head 20. Accordingly, only a filter 60 provided with a keyed collar 64 having a specific key block 642 can be assembled with the filter head 20 that has key blocks 262 with the specific form, shape and arrangement to enable the water treatment system to achieve a specific filtering purpose. As shown in FIG. 20, multiple filters 60 with different filtering effects can be correctly connected to the filter heads 40D by a user easily and conveniently, and a fool-proofing effect is provided.

In addition, the keyed collar 64 may further have an identifying block 644 formed on the keyed collar 64 and spaced from the key block 642. A distance is defined between the identifying block 644 and the key block 642 and is varied by changing the position of the identify block 644. Thus, when the distance between the identifying block 644 and the key block 642 corresponds to the key blocks 262 on the keyed tabs 26 as shown in FIG. 9, the filter 60 can be connected to the filter head 20. When the distance between the identifying block 644 and the key block 642 does not correspond to the key blocks 262 on the keyed tabs 26 as shown in FIG. 10, the filter 60 cannot be connected to the filter head 20. Accordingly, a fool-proofing effect can also be provided. Alternatively, the identifying block may be formed on each keyed tab 26.

Additionally, a positioning device is mounted between the key blocks 262,642 on the keyed tabs 26 and the keyed collar 64 to prevent the filter 60 from being rotated unintentionally. Preferably, the positioning device may comprise multiple positioning rods 646 and positioning recesses 264 formed respectively on the keyed tabs 26 and the key block 642 on the keyed collar 64.

Figure 11:
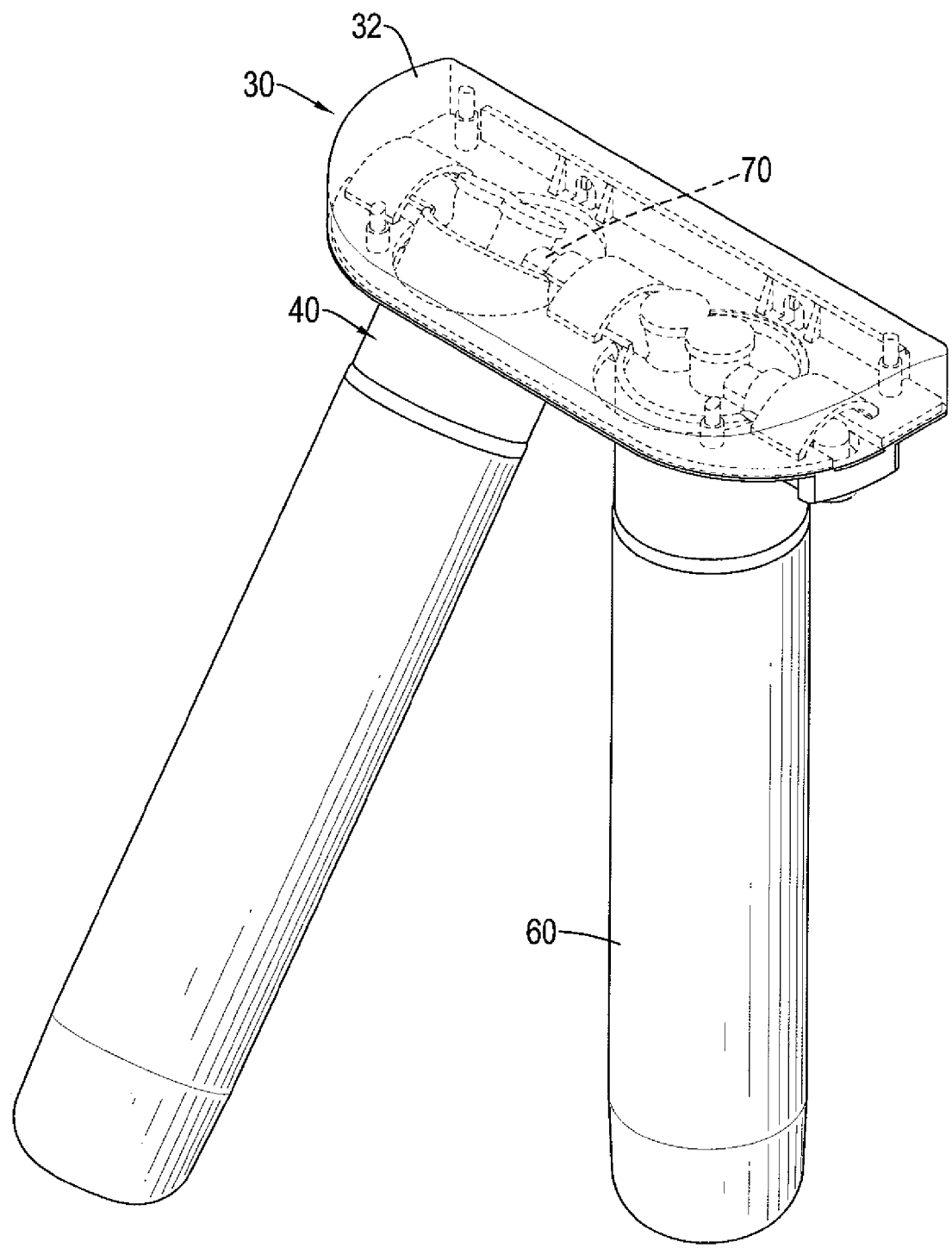
FIG. 11 is a perspective view of another embodiment of a manifold bracket assembly in accordance with the preset invention.
Figure 12:
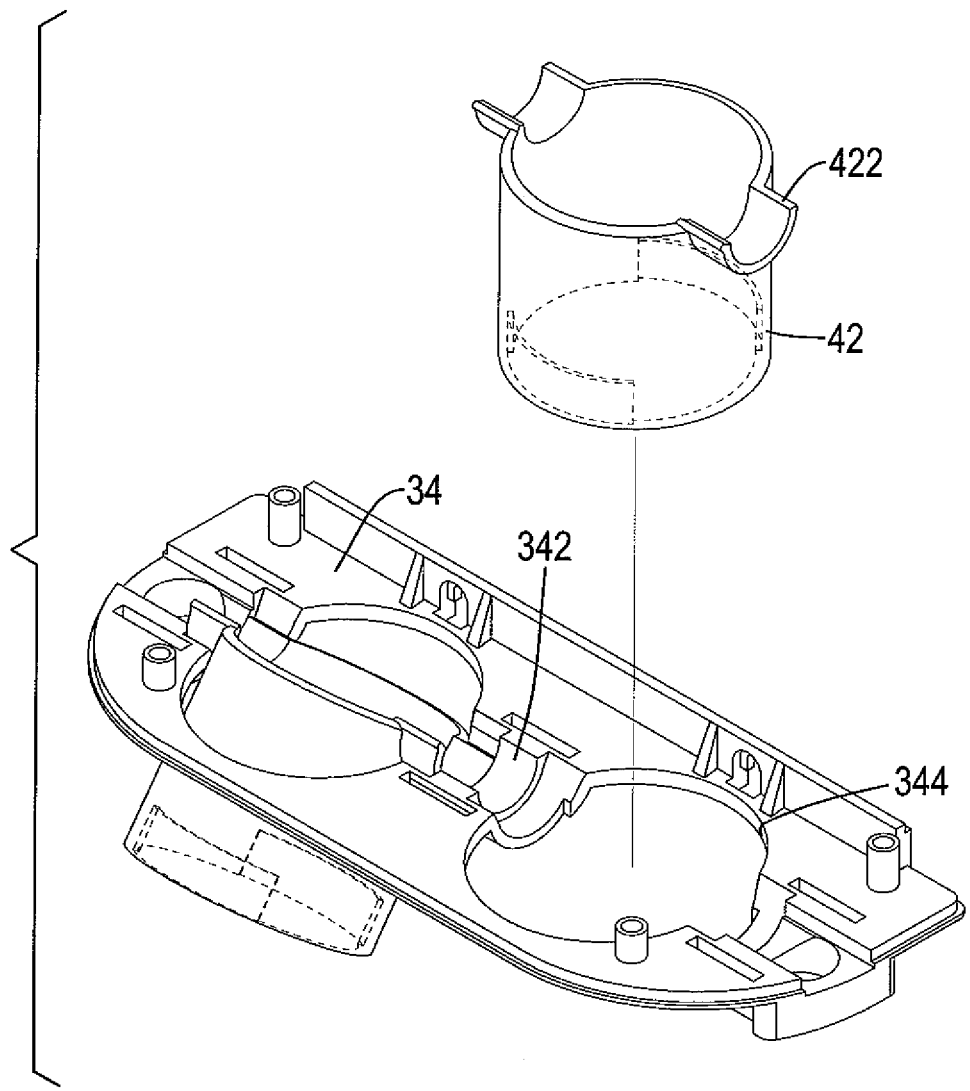
FIG. 12 is a partially exploded perspective view of the outer casings and the supporting bracket of the manifold bracket assembly in FIG. 11.

With reference to FIGS. 11 and 12, the manifold bracket assembly has two filter heads 40 mounted on an elongated bracket body 30. Each filter head 40 has a structure similar to those disclosed in the previous embodiments. In addition, the bracket body 30 further has a supporting bracket 34 mounted in the bracket frame 32. The supporting bracket 34 has a pivoting recess 342 and two mounting holes 344. The pivoting recess 342 is defined in the top of the supporting bracket 34, and the mounting holes 344 are defined through the supporting bracket 34 and communicate with the pivoting recess 342. The outer casing 42 of each filter head 40 has two pivotal ears 422 formed on and protruding laterally from the top end of the outer casing 42. Each pivotal ear has a curved cross section. The outer casings 42 of the filter heads 40 are mounted respectively in the mounting holes 344 in the supporting bracket 34, and the pivotal ears 422 on the outer casings 42 are disposed in the pivoting recess 342. Accordingly, the filter heads 40 are pivotable relative to the bracket body 30, such that to connect the filters 60 to or to detach the filter 60 from the filter heads 40 is easy and convenient.

Figure 13:
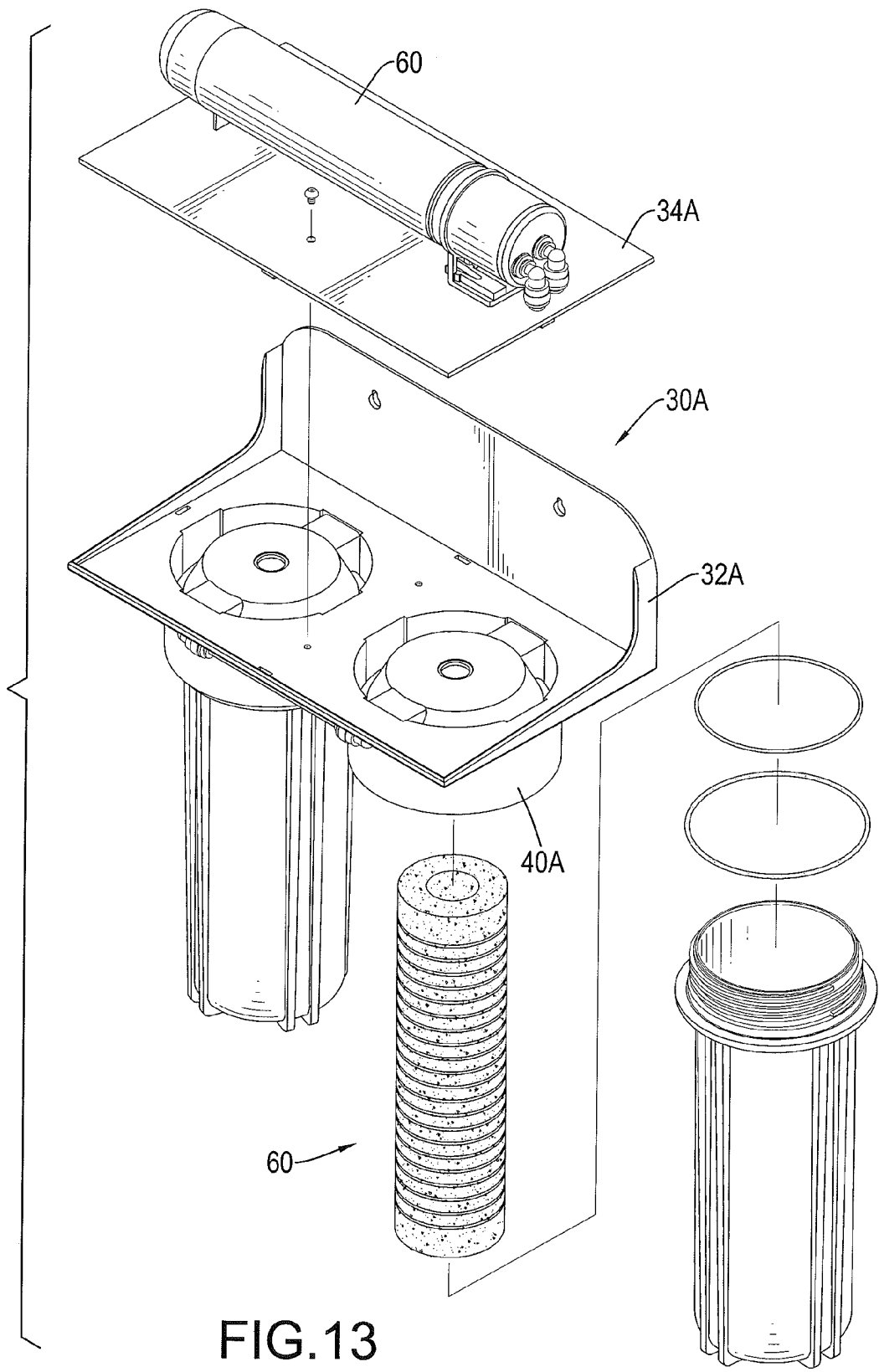
FIG. 13 is an exploded perspective view of an alternative embodiment of a modular encapsulated water treatment system having a manifold bracket assembly in accordance with the present invention.
Figure 14:
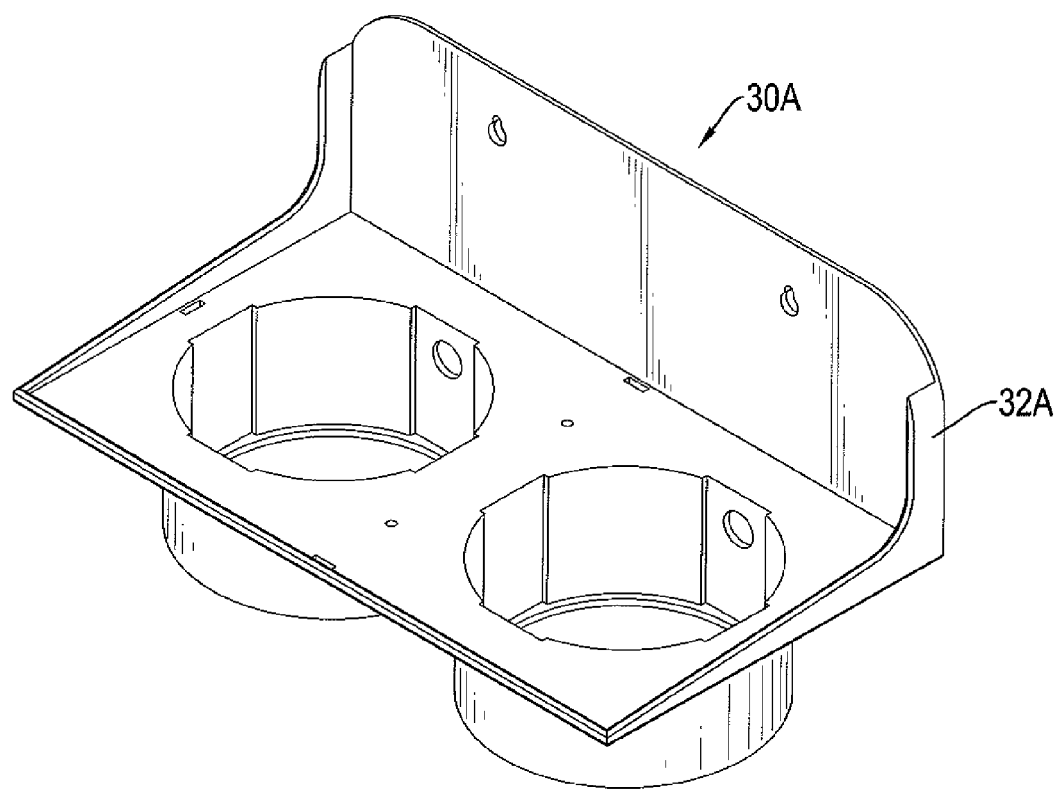
FIG. 14 is a perspective view of the bracket frame in FIG. 13.

With reference to FIGS. 13 and 14, in an alternatively embodiment, the bracket frame 32A of the bracket body 30A is L-shaped in cross section, and an auxiliary board 34A is securely mounted on the top of the bracket frame 32A by fasteners or a high frequency welding process. On the auxiliary board 34A, at least one filter 60 is mounted and can be connected with the filters 60 that are connected with the filter heads 40A with hoses.

With reference to FIGS. 15 to 18, three filter heads 40B are mounted on an elongated bracket frame 32B of the bracket body 30B and can be connected with three filters 60 having cartridges providing specific filtering effects. Each filter 60 has a rubber valve disk 63 mounted in the filter 60 to control the water flow in the water flow passage in the filter 60 or to provide a turn off effect to keep leakage of the filter 60.

Each filter head 40B has a structure similar to those disclosed in the previous embodiments. In addition, an on-off switch 50, a check valve 70 and a flow control valve 80 are selectively mounted in the filter heads 40B. The on-off switch 50 comprises a housing 52, a gasket 54 and a spring 56. The gasket 54 is moveably mounted in the housing 52 and has a pushed rod 542 extending out of the housing 52. The spring 56 is mounted in the housing 52 and abuts with the gasket 54. With the force provided by the spring 56, the gasket 54 closes the flow passage of the on-off switch 50. When a filter 60 is attached to the filter head 40B, the filter 60 will push the pushed rod 542 to move the gasket 54 relative to the housing 52 and to open the flow passage of the on-off switch 50. Accordingly, water can flow into the filter 60 via the on-off switch 50 in the filter head 40B. When the filter 60 is detached from the filter head 40B, the spring 56 will push the gasket 54 to move and to close the flow passage in the on-off switch 50. Thus, water in the filter head 40B can be prevented from leaking during the replacement of the filter 60.

The check valve 70 has a structure similar to that of the on-off switch 50 and comprises a housing 72, a valve disk 74 and a spring 76 but does not have a pushed rod 542. With the arrangement of the check valve 70, the water flow direction in the water filter assembly can be controlled. The flow control valve 80 has a housing 82 and an inserting disk 84. The inserting disk 84 is mounted in the housing 82 and has a flow passage 842 defined through the inserting disk. With various diameter of the flow passage 842 in the inserting disk 84, the water flow passing through the inserting disk 84 can be changed and controlled.

Figure 19:
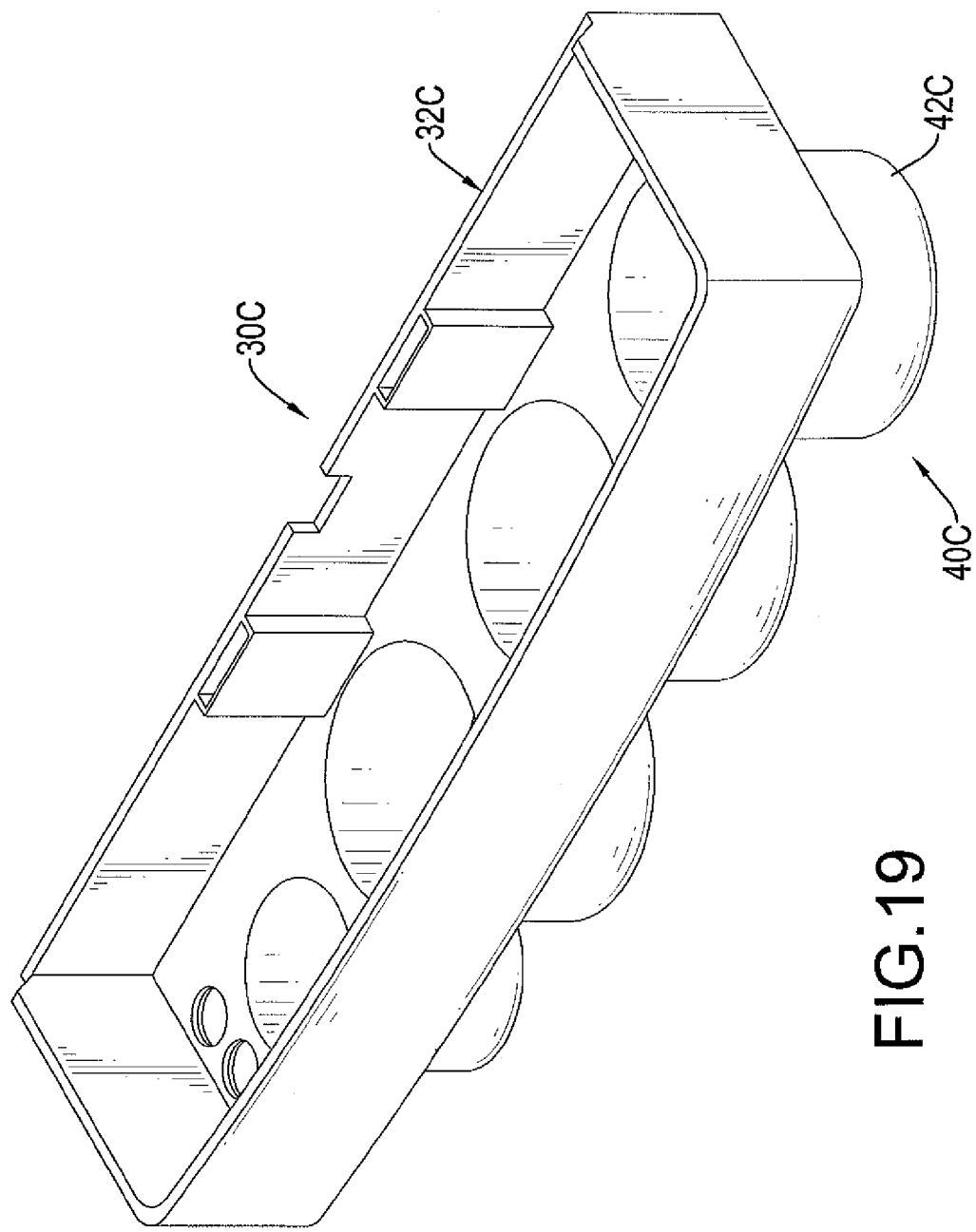
FIG. 19 is a perspective view of an alternative embodiment of a bracket frame of a manifold bracket assembly in accordance with the present invention.

With reference to FIG. 19, in an alternative embodiment, four outer casings 42C of filter heads 40C are mounted on the bracket frame 32C of the bracket body 30C to adapt to connect with four filters.

Figure 15:
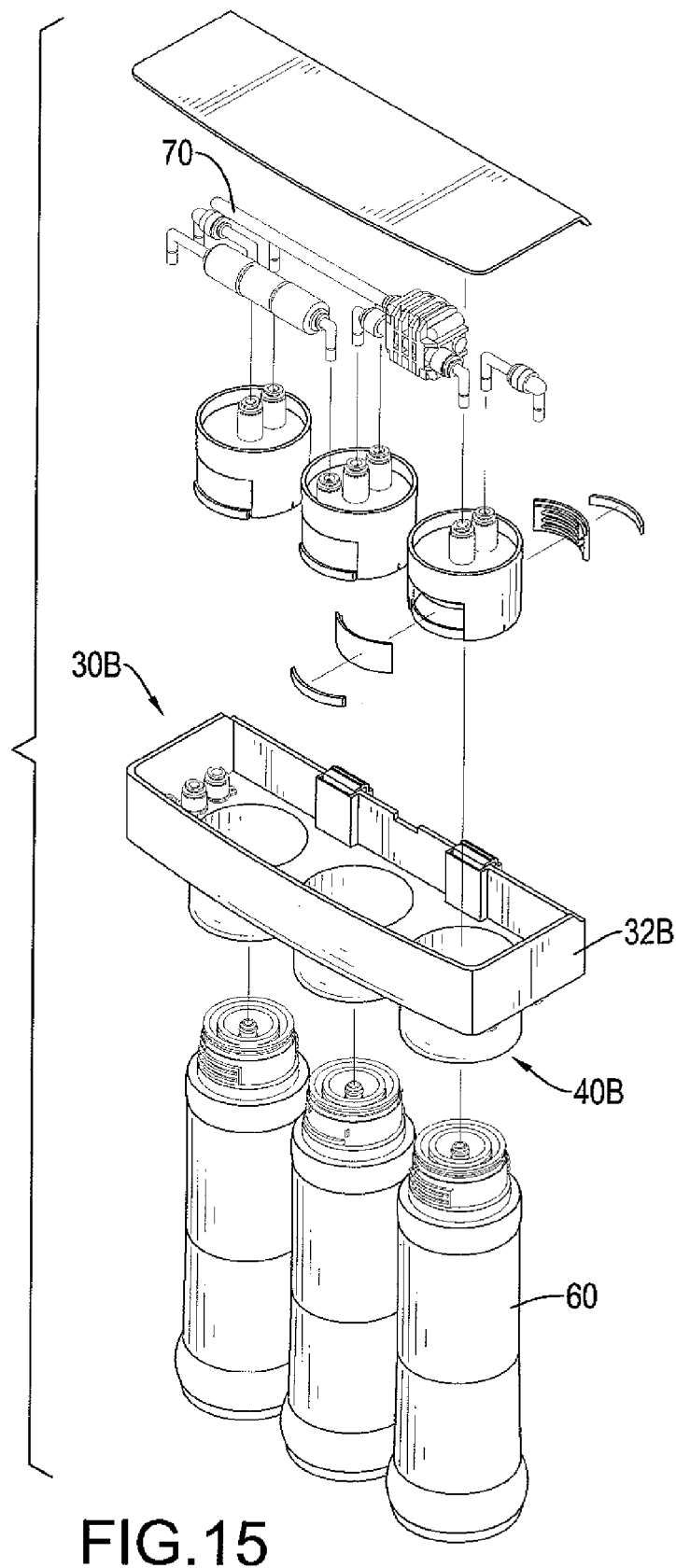
FIG. 15 is an exploded perspective view of a further embodiment of a manifold bracket assembly in accordance with the present invention.
Figure 16:
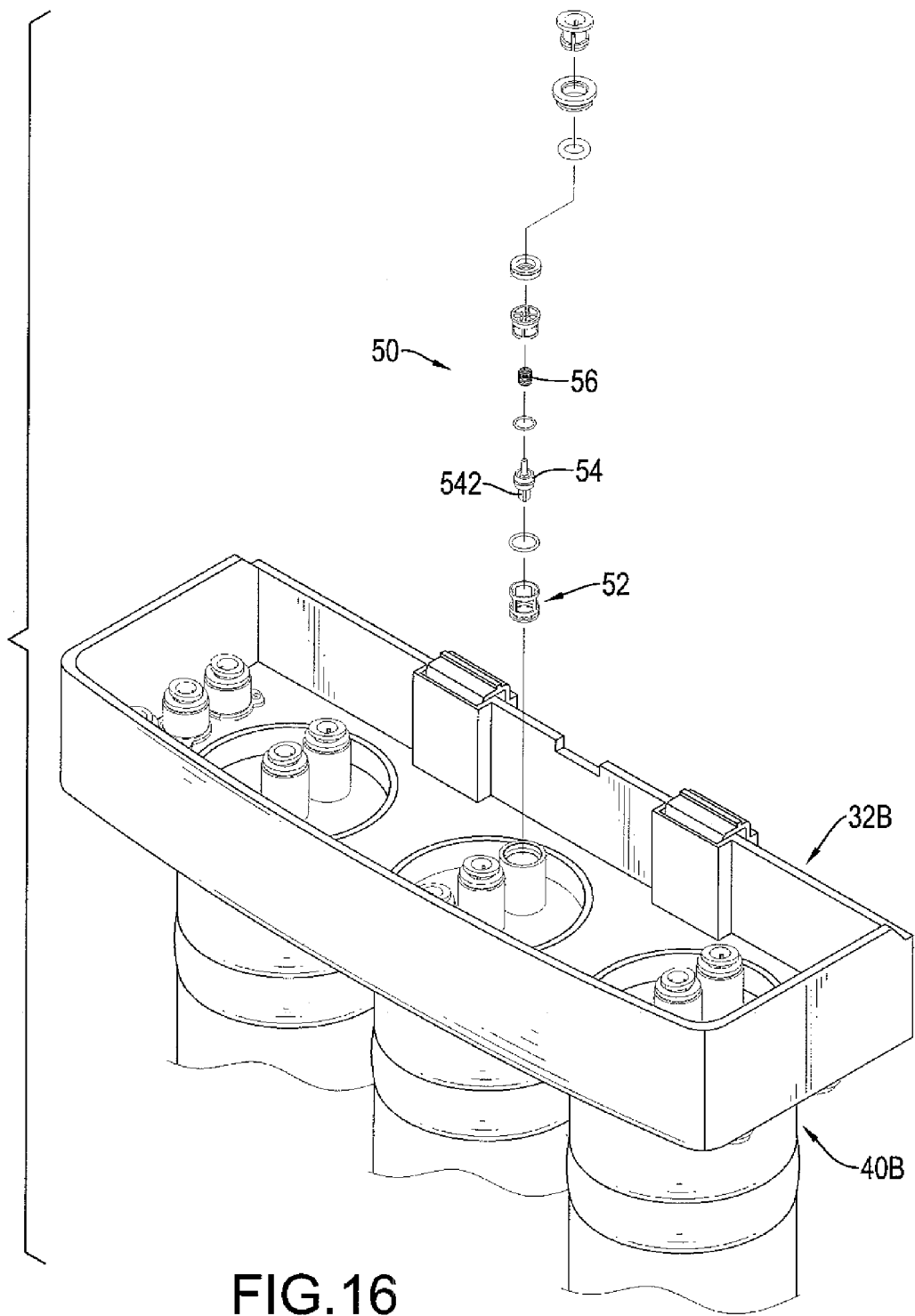
FIG. 16 is an enlarged partially exploded perspective view of an on-off switch mounted in the manifold bracket assembly in FIG. 15.
Figure 17:
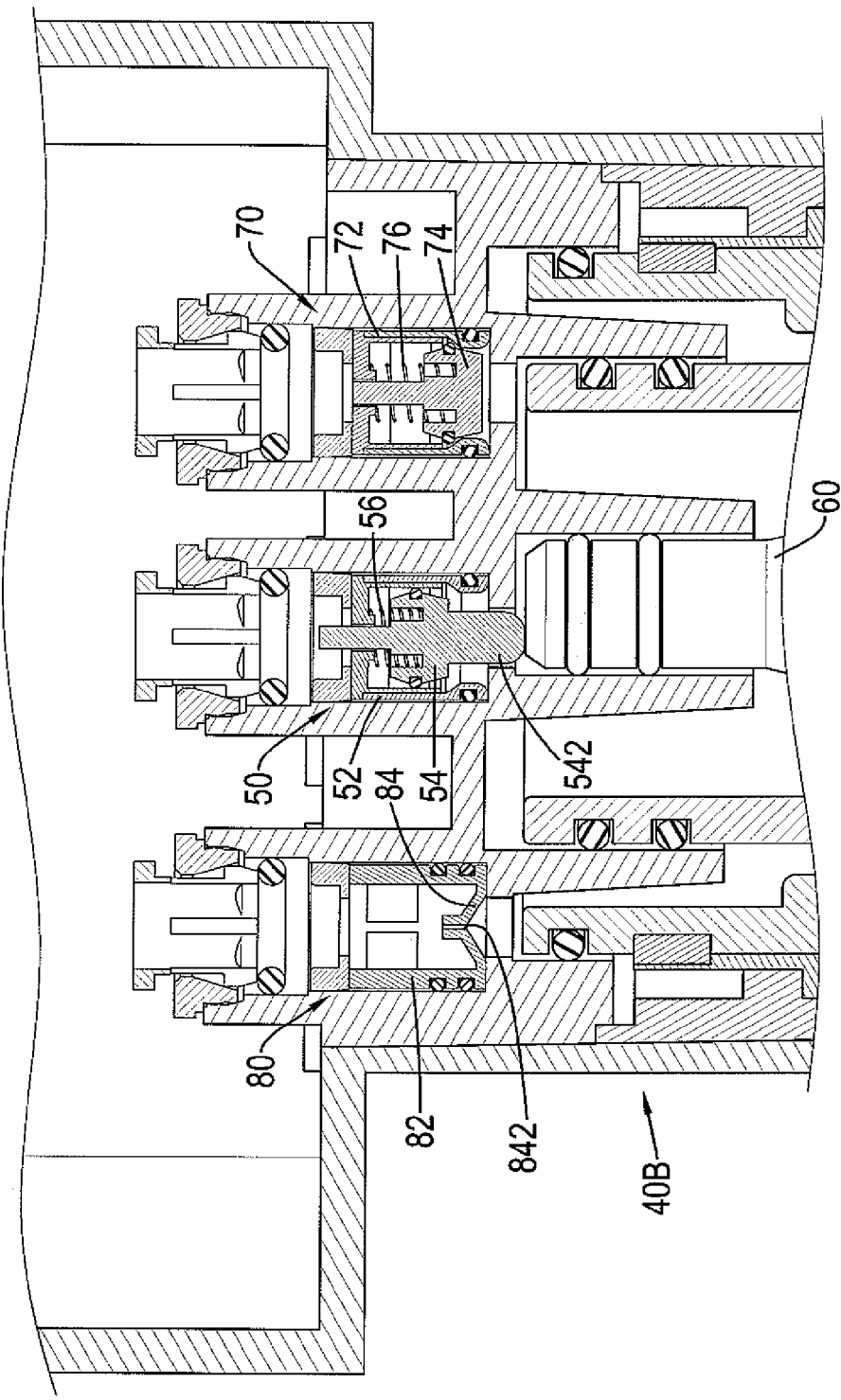
FIG. 17 is an enlarged front view in partial section of the manifold bracket assembly in FIG. 15.
Figure 18:
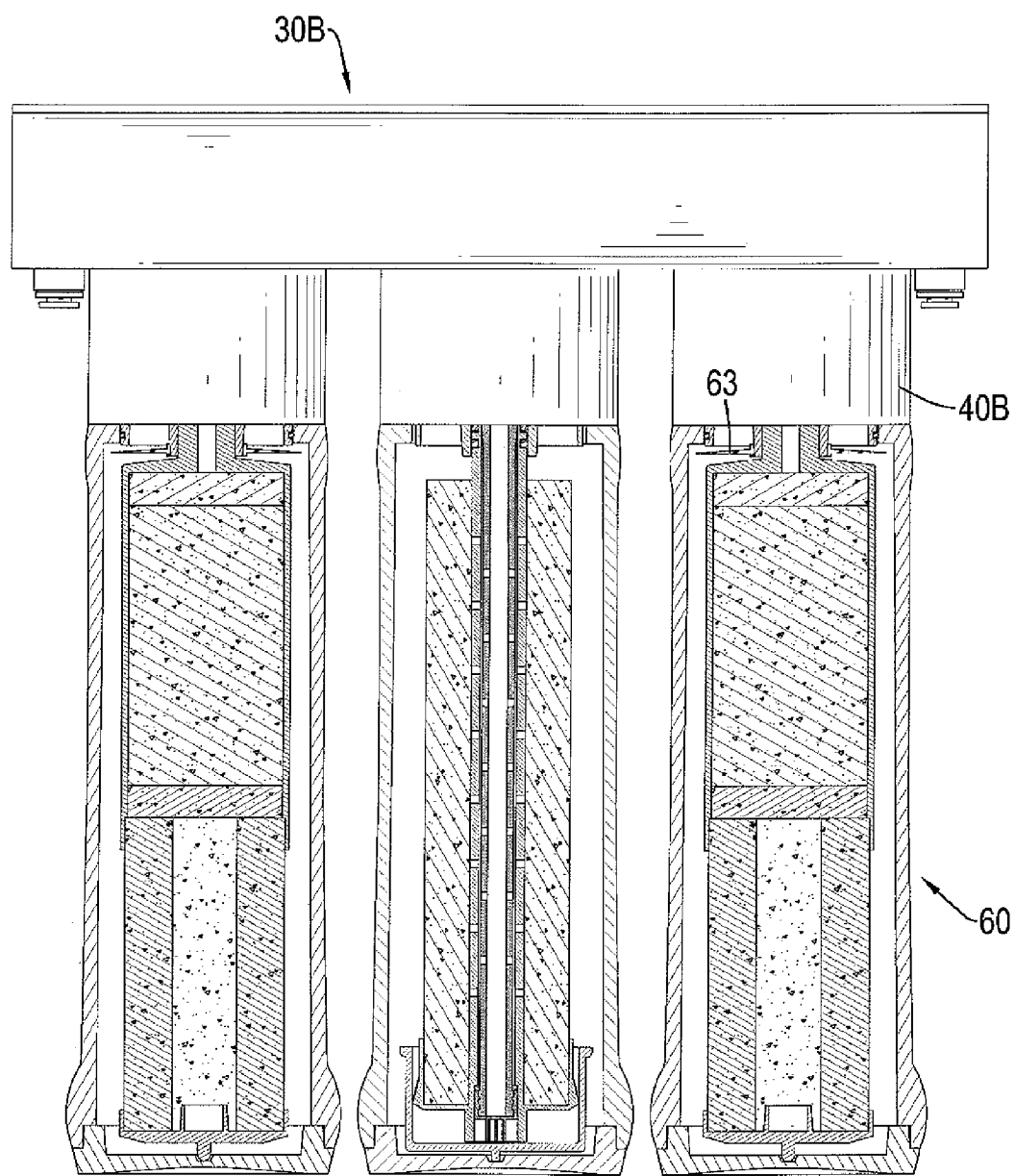
FIG. 18 is a front view in partial section of the manifold bracket assembly in FIG. 15.
Figure 18A:
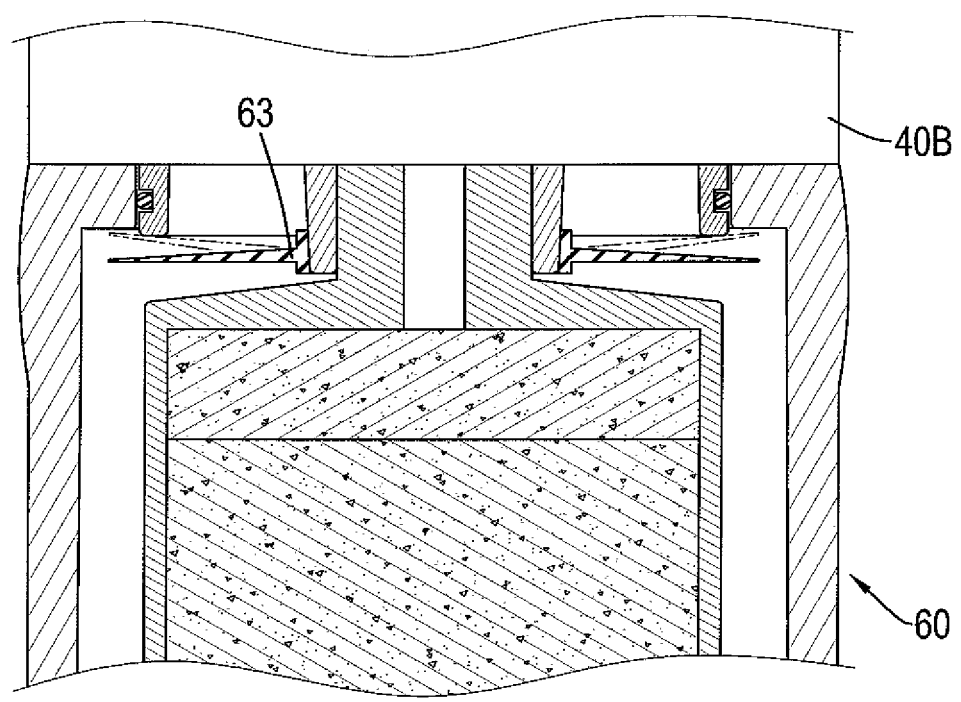
FIG. 18A is an enlarged front view in partial section of the rubber valve disk in the manifold bracket assembly in FIG. 18.

With such a manifold bracket assembly in accordance with the present invention, the filters 60 can be easily connected with each other via the filter heads 40 and hoses 70 as shown in FIGS. 11 and 15. Therefore, a water flow channel can be easily constructed with the hoses 70 even when the hose connectors on the filter connectors are at different horizontal heights and even when the water flow channel is complicated. The conventional mounting brackets are unnecessary, so constructing an encapsulated water treatment system is easy and in a reduced cost.

Figure 21:
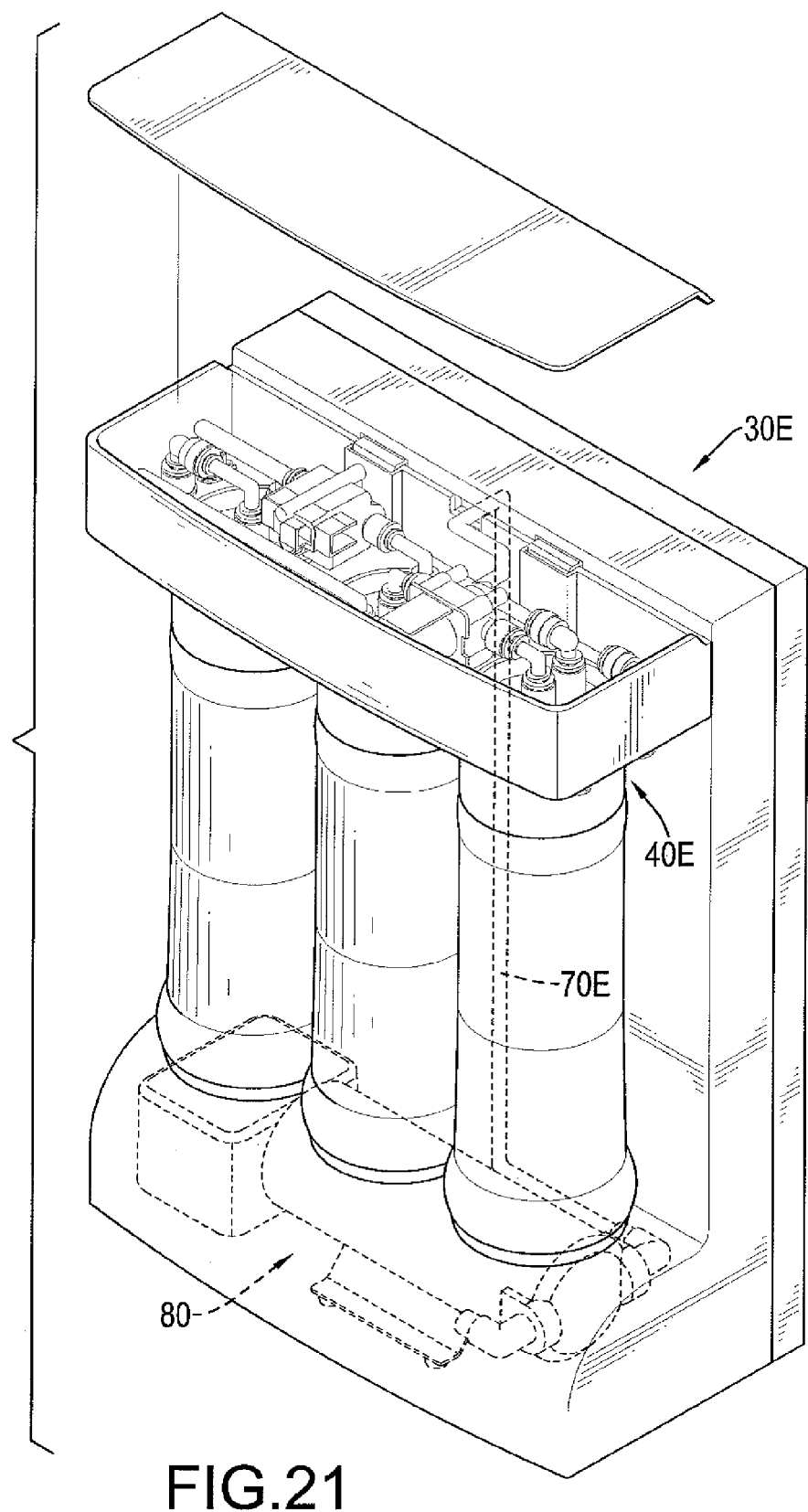
FIG. 21 is an exploded perspective view of a further embodiment of a manifold bracket assembly in accordance with the present invention with filters.

In addition, because the filter heads are connected with each other by the hoses, electric devices, such as flow controllers or pressure gauges, can be easily mounted on the hoses to provide auxiliary functions to the water treatment system. With reference to FIG. 20, a flow controller is attached to the bracket body 30D and connected with the filter heads 40D with a hose. With reference to FIG. 21, a booster pump is mounted in the bracket body 30E and is connected with the filter heads 40E with a hose 70E. Therefore, electric devices for a water treatment system can be easily added and connected to the water treatment system by hoses, and a water treatment system with a manifold bracket assembly in accordance with the present invention is versatile in use.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A manifold bracket assembly for a modular encapsulated water treatment system comprising:
a bracket body; and
multiple filter heads mounted on the bracket body, with each filter head comprising:
an outer casing mounted on the bracket body and having
an inner surface; and
two securing recesses defined in the inner surface of the outer casing;
a tubular filter connector mounted in the outer casing and having
an outer surface;
two tab holes defined through the outer surface of the tubular filter connector and aligning respectively with the two securing recesses in the outer casing; and
multiple hose connectors mounted on the tubular filter connector;
two keyed tabs mounted respectively in the two tab holes in the tubular filter connector, with each keyed tab having an inner surface and a key block formed on the inner surface of the keyed tab; and
two tab fasteners mounted respectively in and protruding partially out of the two tab holes and extending respectively into the two securing recesses to securely hold the tubular filter connector in the outer casing.

2. The manifold bracket assembly as claimed in claim 1, wherein each tab fastener is C-shaped and has a curvature different from that of a corresponding one of the two tab holes.

3. The manifold bracket assembly as claimed in claim 2, wherein the two securing recesses in the outer casing of each filter head are located diametrically opposed to each other.

4. The manifold bracket assembly claimed in claim 3, wherein each keyed tab further has an identifying block formed on the keyed tab and spaced from the key block on the keyed tab.

5. The manifold bracket assembly as claimed in claim 4, wherein each filter head has an on-off switch mounted in the filter head.

6. The manifold bracket assembly as claimed in claim 5, wherein the on-off switch in each filter head comprises
a housing mounted in the filter head;
a gasket moveably mounted in the housing and having a pushed rod extending out of the housing; and
a spring mounted in the housing and abutting with the gasket.

7. The manifold bracket assembly as claimed in claim 6, wherein each filter head further has at least one positioning rib and at least one positioning recess respectively formed on the inner surface of the outer casing and the filter connector of the filter head and engaging each other respectively.

8. The manifold bracket assembly as claimed in claim 1, wherein the two securing recesses in the outer casing of each filter head are located diametrically opposed to each other.

9. The manifold bracket assembly claimed in claim 1, wherein each keyed tab further has an identifying block formed on the keyed tab and spaced from the key block on the keyed tab.

10. The manifold bracket assembly as claimed in claim 1, wherein each filter head has an on-off switch mounted in the filter head.

11. The manifold bracket assembly as claimed in claim 10, wherein the on-off switch in each filter head comprises
a housing mounted in the filter head;
a gasket moveably mounted in the housing and having a pushed rod extending out of the housing; and
a spring mounted in the housing and abutting with the gasket.

12. The manifold bracket assembly as claimed in claim 1, wherein each filter head further has at least one positioning rib and at least one positioning recess respectively formed on the inner surface of the outer casing and the filter connector of the filter head and engaging each other respectively.

* * * * *